(12) United States Patent
Satou et al.

(10) Patent No.: US 8,836,180 B2
(45) Date of Patent: Sep. 16, 2014

(54) GENERATOR MOTOR COOLING STRUCTURE AND GENERATOR MOTOR

(75) Inventors: Norihiko Satou, Hiratsuka (JP); Yukihiko Sugimoto, Kamakura (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/818,427

(22) PCT Filed: Mar. 26, 2012

(86) PCT No.: PCT/JP2012/057748
§ 371 (c)(1),
(2), (4) Date: Feb. 22, 2013

(87) PCT Pub. No.: WO2012/133305
PCT Pub. Date: Oct. 4, 2012

(65) Prior Publication Data
US 2013/0154408 A1  Jun. 20, 2013

(30) Foreign Application Priority Data
Mar. 31, 2011 (JP) ................................ 2011-080711

(51) Int. Cl.
| | |
|---|---|
| H02K 9/00 | (2006.01) |
| H02K 9/19 | (2006.01) |
| H02K 5/20 | (2006.01) |
| H02K 7/08 | (2006.01) |
| H02K 7/14 | (2006.01) |
| H02K 7/18 | (2006.01) |

(52) U.S. Cl.
CPC ........ *H02K 9/005* (2013.01); *H02K 7/14* (2013.01); H02K 7/18 (2013.01); *H02K 9/19* (2013.01); H02K 5/20 (2013.01); *H02K 7/086* (2013.01)
USPC ................ 310/61; 310/52; 310/54; 310/57; 310/59; 310/102 R

(58) Field of Classification Search
CPC ........... H02K 9/005; H02K 9/19; H02K 5/20; H02K 7/14; H02K 7/18

USPC ....... 310/58, 59, 60 A, 61, 90, 102 R, 52, 57; 180/65.21
IPC ...................... H02K 9/00,9/19, 5/20, 7/14, 7/18
See application file for complete search history.

(56) References Cited

U.S. PATENT DOCUMENTS

| | | | |
|---|---|---|---|
| 3,265,912 A | * | 8/1966 | Baudry ........................... 310/59 |
| 3,479,541 A | | 11/1969 | Robinson |

(Continued)

FOREIGN PATENT DOCUMENTS

| | | |
|---|---|---|
| CN | 201629629 U | 11/2010 |
| DE | 102007033457 | 2/2008 |

(Continued)

OTHER PUBLICATIONS

Decision of a Patent Grant of Japanese Patent Application No. 2011-080711, mailed Dec. 25, 2012 and English translation thereof.

(Continued)

*Primary Examiner* — John K Kim
(74) *Attorney, Agent, or Firm* — Edwards Wildman Palmer LLP; James E. Armstrong, IV; Jonathon P. Western

(57) ABSTRACT

A generator motor cooling structure for cooling a generator motor, which includes a housing storing an input/output shaft to which a rotor is attached and a stator disposed at an outer periphery portion of the rotor, by a cooling medium, includes: a protrusion portion that protrudes toward the rotor from a surface at a side of the housing of an end side member disposed at one end portion of the housing in a direction of a central rotation axis of the input/output shaft, wherein the protrusion portion is provided on an inner side of a coil of the stator in a radial direction, on an outer side of a bearing attached to the input/output shaft in the radial direction, in at least a partial region on a periphery of the central rotation axis.

6 Claims, 15 Drawing Sheets

(56) References Cited

U.S. PATENT DOCUMENTS

| | | | |
|---|---|---|---|
| 3,760,209 A * | 9/1973 | Hult | 310/91 |
| 3,786,289 A * | 1/1974 | Baclawski et al. | 310/90 |
| 3,794,869 A * | 2/1974 | Apostoleris | 310/90 |
| 3,833,276 A * | 9/1974 | Baumann et al. | 384/466 |
| 4,151,430 A * | 4/1979 | Stark | 310/90 |
| 5,757,094 A * | 5/1998 | van Duyn | 310/58 |
| 5,925,960 A * | 7/1999 | Hayes | 310/211 |
| 6,054,844 A * | 4/2000 | Frank | 322/16 |
| 6,437,468 B2 * | 8/2002 | Stahl et al. | 310/61 |
| 7,834,492 B2 | 11/2010 | Iund et al. | |
| 7,952,243 B2 * | 5/2011 | Sopp | 310/64 |
| 8,232,697 B2 * | 7/2012 | Chiba et al. | 310/75 D |
| 8,415,843 B2 * | 4/2013 | Li et al. | 310/60 A |
| 8,456,046 B2 * | 6/2013 | Bradfield | 310/58 |
| 8,519,581 B2 * | 8/2013 | Bradfield | 310/58 |
| 2009/0184592 A1 | 7/2009 | Sano et al. | |
| 2011/0001400 A1 * | 1/2011 | Chiba et al. | 310/67 R |
| 2011/0074233 A1 | 3/2011 | Okada et al. | |
| 2011/0298317 A1 * | 12/2011 | Bradfield | 310/58 |
| 2012/0032538 A1 * | 2/2012 | Kasuya et al. | 310/54 |
| 2013/0115064 A1 * | 5/2013 | Kimura et al. | 415/177 |
| 2013/0119803 A1 * | 5/2013 | Sugimoto et al. | 310/91 |
| 2013/0154408 A1 * | 6/2013 | Satou et al. | 310/61 |

FOREIGN PATENT DOCUMENTS

| | | |
|---|---|---|
| DE | 102008001618 A1 | 11/2009 |
| JP | 2003-169448 A | 6/2003 |
| JP | 2004-282902 A | 10/2004 |
| JP | 2007-006554 A | 1/2007 |
| JP | 2007-159325 A | 6/2007 |
| JP | 2009-071905 A | 4/2009 |
| JP | 2009-171755 A | 7/2009 |
| JP | 2009-201217 A | 9/2009 |
| JP | 2009-291056 A | 12/2009 |
| JP | 2010-053596 A | 3/2010 |

OTHER PUBLICATIONS

International Search Report dated Jun. 26, 2012, issued for PCT/JP2012/057748.

Examiner's First Offical Letter/Examination Report, mailed May 16, 2014, German Appl. No. 11 2012 000 078.1, 10 pages, München, Germany.

* cited by examiner

A-A

GENERATOR MOTOR COOLING STRUCTURE AND GENERATOR MOTOR

FIELD

The present invention relates to cooling a generator motor by a cooling medium.

BACKGROUND

A generator motor is used in various applications, but generates heat by Joule heating of a coil included in a stator, an eddy current loss and a hysteresis loss of a rotor core, or the like. In order to cool a generator motor, there is disclosed a technology for cooling a generator motor by using, for example, a cooling medium such as oil serving as both lubricating oil and cooling oil (Patent Literature 1).

CITATION LIST

Patent Literature

Patent Literature 1: Japanese Patent Application Laid-open No. 2009-071905

SUMMARY

Technical Problem

When a cooling medium such as oil is used to cool a generator motor, insufficient cooling of a stator coil may be caused by a variation in the flow rate of a cooling medium flowing through a cooling medium passage in the generator motor. An object of the present invention is to suppress the insufficient cooling of a stator coil when a cooling medium is used to cool a generator motor.

Solution to Problem

To achieve the object mentioned above, according to the present invention, a generator motor cooling structure for cooling a generator motor, which includes a housing storing an input/output shaft to which a rotor is attached and a stator disposed at an outer periphery portion of the rotor, by a cooling medium, comprises: a protrusion portion that protrudes toward the rotor from a surface at a side of the housing of an end side member disposed at one end portion of the housing in a direction of a central rotation axis of the input/output shaft, wherein the protrusion portion is provided on an inner side of a coil of the stator in a radial direction, on an outer side of a bearing attached to the input/output shaft in the radial direction, in at least a partial region on a periphery of the central rotation axis.

According to the present invention, the generator motor cooling structure, further comprises: an annular-shaped blade that is provided at an end portion of the rotor in in the direction of the central rotation axis; a cooling medium holding portion that is provided at an outer periphery portion of the blade, is opened to an inner side of the blade in the radial direction, and holds the cooling medium cooling the generator motor; and a cooling medium outflow hole that is provided at the blade and passes the cooling medium held by the cooling medium holding portion to an outer side in the radial direction, wherein the protrusion portion is disposed at an inner side in the radial direction than the opening of the cooling medium holding portion.

According to the present invention, an end portion of the protrusion portion in the direction of the central rotation axis is located at a side of the opening of the cooling medium holding portion than an end portion of a side of the protrusion portion of the cooling medium holding portion.

According to the present invention, the protrusion portion is provided on an entire periphery of the central rotation axis of the input/output shaft.

According to the present invention, a generator motor comprises a generator motor cooling structure for cooling a generator motor, which includes a housing storing an input/output shaft to which a rotor is attached and a stator disposed at an outer periphery portion of the rotor, by a cooling medium, comprising: a protrusion portion that protrudes toward the rotor from a surface at a side of the housing of an end side member disposed at one end portion of the housing in a direction of a central rotation axis of the input/output shaft, wherein the protrusion portion is provided on an inner side of a coil of the stator in a radial direction, on an outer side of a bearing attached to the input/output shaft in the radial direction, in at least a partial region on a periphery of the central rotation axis.

According to the present invention, an output shaft of a power generating source is connected to one end of the input/output shaft, and an input shaft of a target to be driven by power of the power generating source is connected to the other end of the input/output shaft.

According to the present invention, a generator motor cooling structure for cooling a generator motor, which includes a housing storing an input/output shaft to which a rotor is attached and a stator disposed at an outer periphery portion of the rotor, comprises: a protrusion portion that protrudes toward the rotor from a surface at a side of the housing of an end side member disposed at one end portion of the housing in a direction of a central rotation axis of the input/output shaft, and is provided on an entire periphery of the central rotation axis of the input/output shaft; annular-shaped blades that are provided at both end portions of the rotor in the direction of the central rotation axis; a cooling medium holding portion that is provided at an outer periphery portion of each of the blades, is opened to an inner side of the blade in the radial direction, and holds a cooling medium cooling the generator motor; and a cooling medium outflow hole that is provided at each of the blades and passes the cooling medium held by the cooling medium holding portion to an outer side in the radial direction, wherein the protrusion portion is disposed at an inner side in the radial direction than the opening of the cooling medium holding portion, and an end portion of the protrusion portion in the direction of the central rotation axis overlaps with an end portion of the cooling medium holding portion in the direction of the central rotation axis.

The present invention can suppress the insufficient cooling of a stator coil when a cooling medium is used to cool a generator motor.

DESCRIPTION OF EMBODIMENTS

Modes (embodiments) for implementing the present invention will be described in detail with reference to the drawings. The present invention is not limited by the contents described in the following embodiments. Also, the components described below include the ones that can be easily conceived by those skilled in the art and are substantially equivalent. In addition, the components described below can be combined appropriately. Also, the components may be variously omitted, substituted, or modified without departing from the scope of the subject matter of the present invention.

<Hybrid Hydraulic Shovel>

Figure 1:
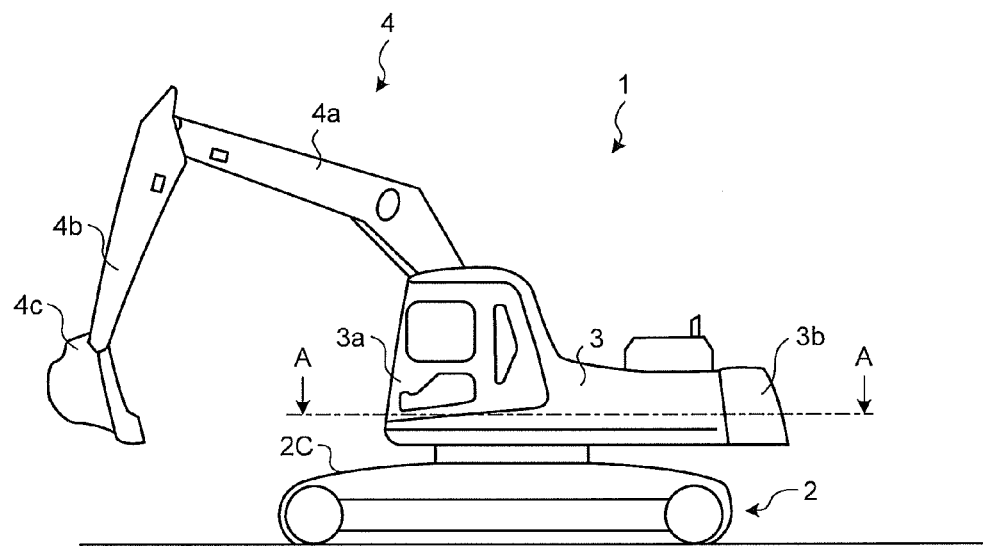
FIG. 1 is a side view illustrating a hybrid hydraulic shovel using a generator motor according to the present embodiment.
Figure 2:
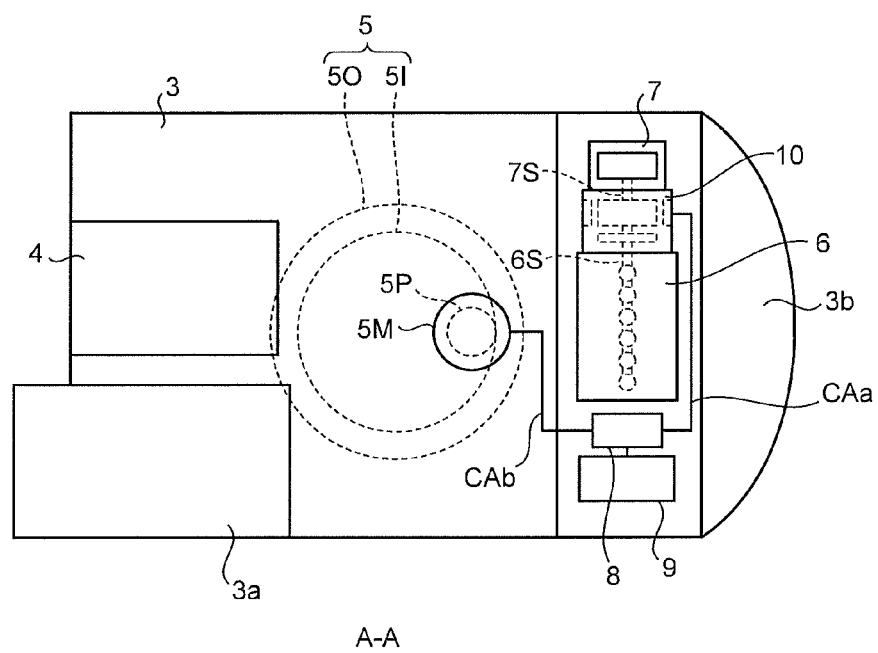
FIG. 2 is an A-A arrow view of FIG. 1.

FIG. 1 is a side view illustrating a hybrid hydraulic shovel 1 using a generator motor according to the present embodiment. FIG. 2 is an A-A arrow view of FIG. 1. A hybrid hydraulic shovel 1 is a so-called hybrid construction vehicle that drives a generator motor by an internal combustion engine to generate power and drives a motor by the power to turn an upper turn body or drive an auxiliary machinery of the hybrid hydraulic shovel 1.

The hybrid hydraulic shovel 1 includes a lower running body 2 including a pair of left and right caterpillars 2C; an upper turning body 3; an operating machine 4 including a boom 4a, an arm 4b, and a bucket 4c and attached to the upper turning body 3; and a swing circle 5 connecting the lower running body 2 and the upper turning body 3. The pair of left and right caterpillars 2C is driven by a right side hydraulic motor and a left side hydraulic motor to run the hybrid hydraulic shovel 1. The right side hydraulic motor and the left side hydraulic motor are driven by operating oil that is pumped from a hydraulic pump 7 illustrated in FIG. 2.

The upper turning body 3 is turned by a motor 5M (see FIG. 2) that functions as a turning motor. An outer race 50 of the swing circle 5 is fixed to the upper turning body 3, and an inner race 5I of the swing circle 5 is fixed to the lower running body 2. By this configuration, the swing circle 5 connects the upper turning body 3 and the lower running body 2. An input/output shaft of the motor 5M is connected to a swing pinion 5P through a swing machinery that includes a decelerating mechanism. The swing pinion 5P is meshed with an internal tooth that is attached to the inner race 5I. A driving force of the motor 5M is transmitted through the swing machinery to the swing pinion 5P to turn the upper turning body 3. In the present embodiment, when the motor 5M is vertically disposed, that is, when the hybrid hydraulic shovel 1 is installed on a horizontal plane, the input/output shaft of the motor 5M is provided toward a gravitational direction. By the operating oil pumped from the hydraulic pump 7 illustrated in FIG. 2, the boom 4a, the arm 4b, and the bucket 4c are driven through a control valve respectively by a hydraulic cylinders for the boom 4a, the arm 4b, and the bucket 4c respectively to execute an operation such as excavation.

The upper turning body 3 is a structure that is substantially rectangular-shaped in a plan view. A control cabin 3a of the upper turning body 3 is disposed at the front left side of the upper turning body 3, when assuming that the line of sight of an operator is primarily directed toward the front side during an operation of the hybrid hydraulic shovel 1. A counter weight 3b is disposed at the rear side of the upper turning body 3. In addition to the control cabin 3a and the counter weight 3b, the upper turning body 3 includes an internal combustion engine 6 as a power generating source of the hybrid hydraulic shovel 1, a generator motor 10 according to the present embodiment, the hydraulic pump 7, an inverter 8, and an electric storage device 9.

The internal combustion engine 6 is, for example, a diesel engine, but the type of the internal combustion engine 6 is not limited thereto. The internal combustion engine 6, the generator motor 10, the hydraulic pump 7, the inverter 8, and the electric storage device 9 are disposed at the front side of the counter weight 3b, that is, the control cabin 3a side. The generator motor 10 is disposed between the internal combustion engine 6 and the hydraulic pump 7. An output shaft 6S of the internal combustion engine 6 is connected to an input/output shaft of the generator motor 10, and the input/output shaft of the generator motor 10 is connected to an input shaft 7S of the hydraulic pump 7. By this configuration, the internal combustion engine 6 drives the generator motor 10 to generate power and drive the hydraulic pump 7. That is, the hydraulic pump 7 is driven through the generator motor 10. Also, the generator motor 10 may be indirectly connected to the output shaft side of the engine through a PTO (Power Take Off).

A high-voltage wiring CAa is electrically connected to an input/output terminal of the inverter 8 and a power input/output terminal of the generator motor 10. A high-voltage wiring CAb is electrically connected to an output terminal of the inverter 8 and an input terminal of the motor 5M. The inverter 8 stores power generated by the generator motor 10 in the electric storage device 9 such as a capacitor or a secondary battery, or supplies the power to the motor 5M to drive the motor 5M. Also, when a swing brake of the upper turning body 3 is operated, the inverter 8 stores power, which is obtained by converting the kinetic energy of the upper turning body 3 into electric energy by the motor 5M, in the electric storage device 9. Then, the power stored in the electric storage device 9 is supplied by the inverter 8 to the motor 5M when the upper turning body 3 is turned. If necessary, the generator motor 10 may be supplied with the power from the electric storage device 9 to operate as a motor and supplement the internal combustion engine 6.

In this manner, the generator motor 10 according to the present embodiment is applied to the hybrid hydraulic shovel 1 that is a kind of construction vehicle. Also, the application target of the generator motor 10 is not limited to the hybrid hydraulic shovel 1. For example, the generator motor 10 may also be applied to other hybrid construction machines such as a wheel loader.

<Generator Motor>

Figure 3:
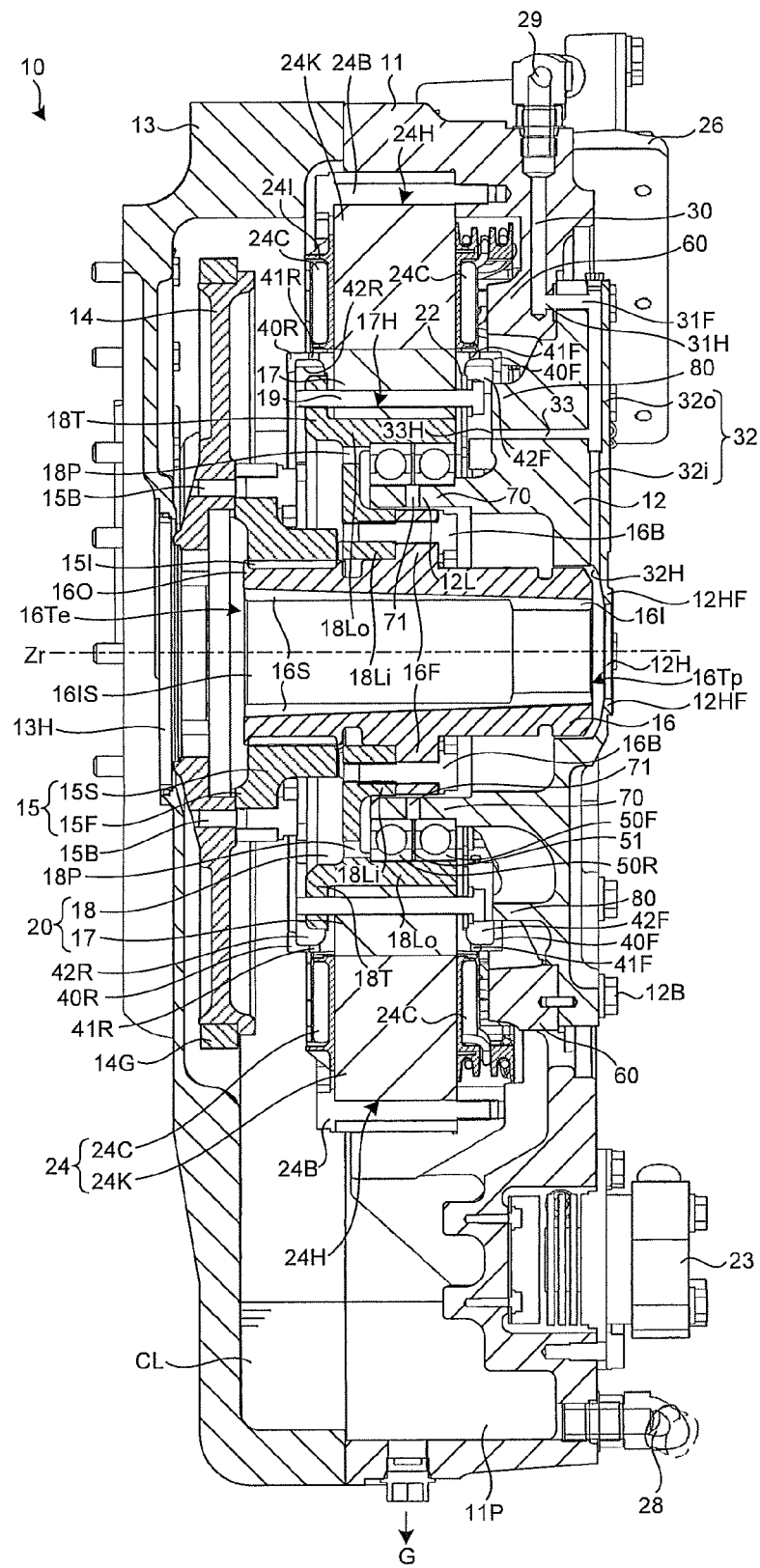
FIG. 3 is a cross-sectional view of the generator motor according to the present embodiment.
Figure 4:
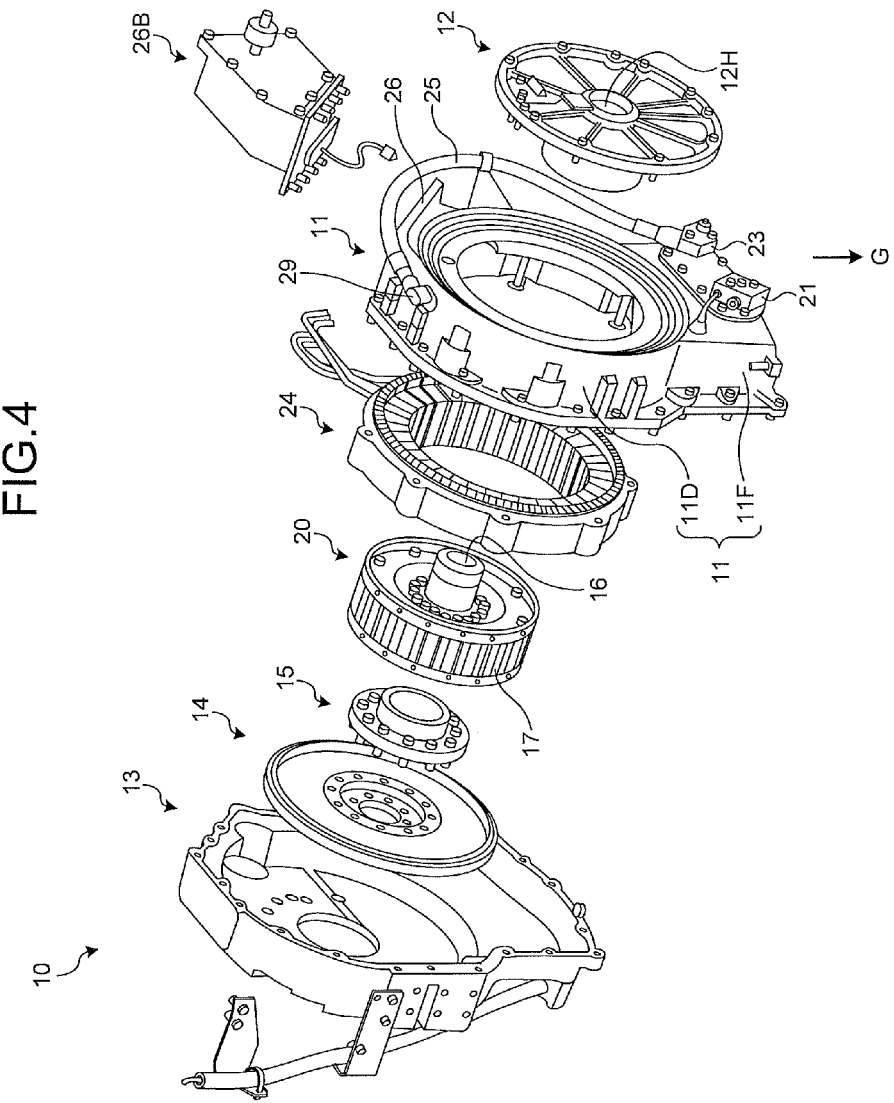
FIG. 4 is an exploded view of the generator motor according to the present embodiment.
Figure 5:
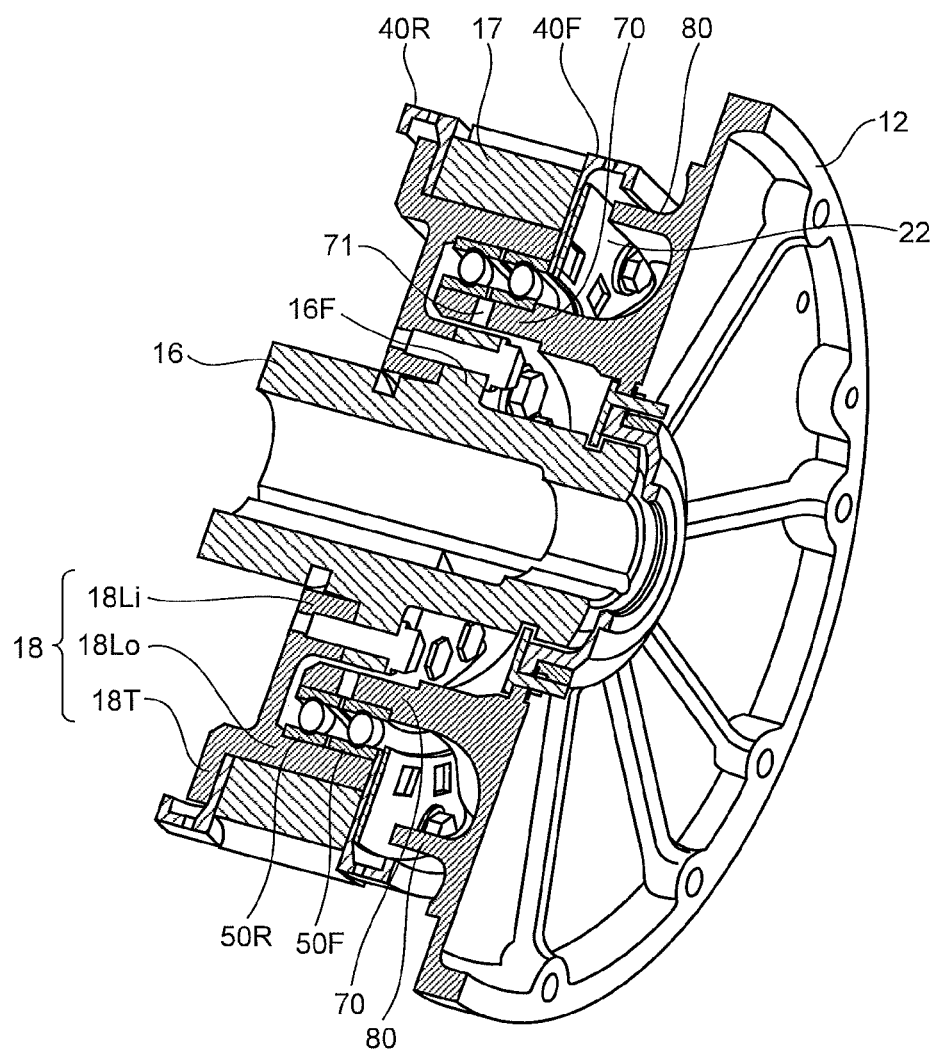
FIG. 5 is a perspective view illustrating a configuration of an input/output shaft, a rotor, and a flange of the generator motor according to the present embodiment.
Figure 6:
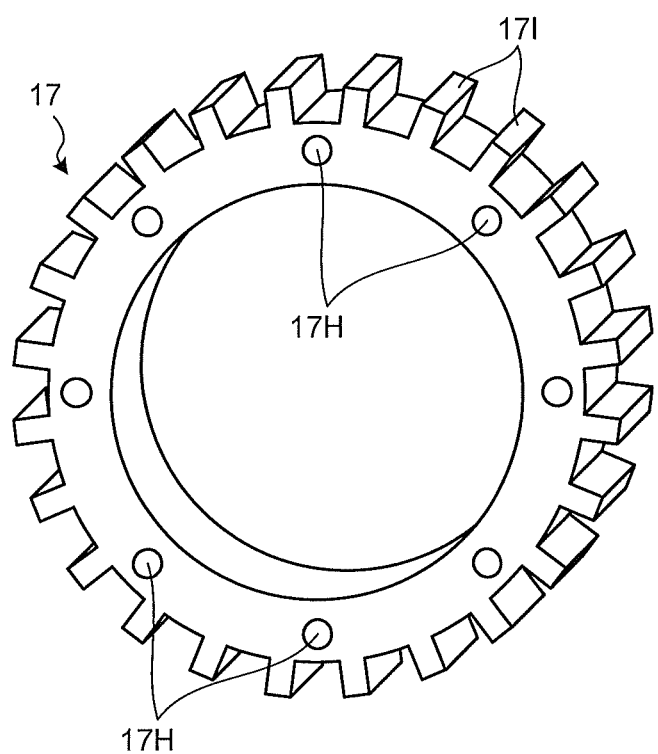
FIG. 6 is a perspective view of a rotor core included in the generator motor according to the present embodiment.
Figure 7:
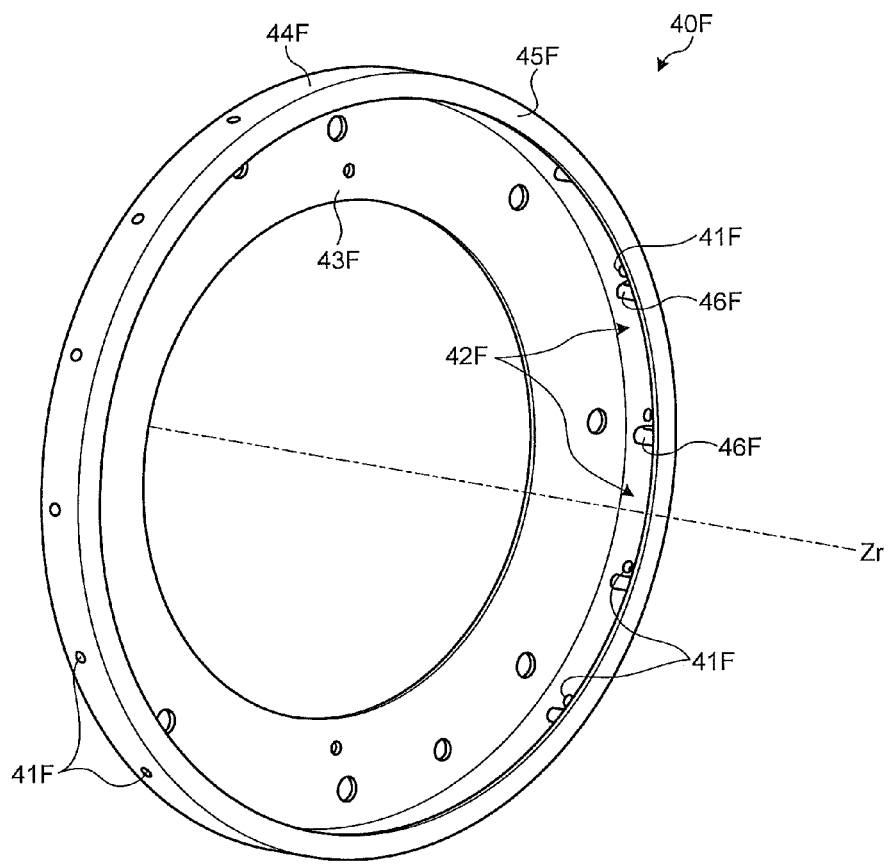
FIG. 7 is a perspective view illustrating a blade attached to the rotor core.
Figure 8:
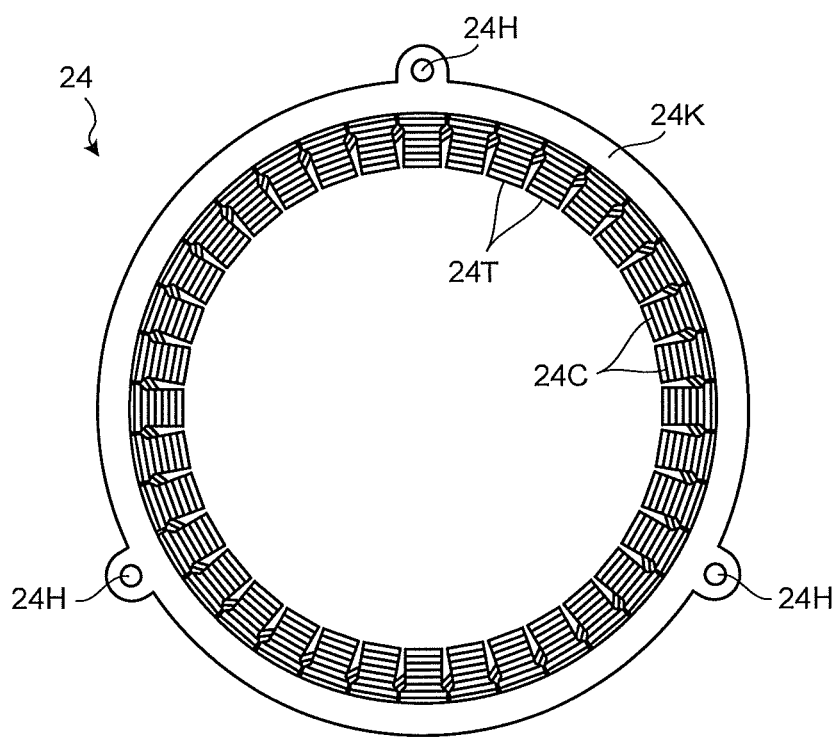
FIG. 8 is a front view of a stator included in the generator motor according to the present embodiment.
Figure 9:
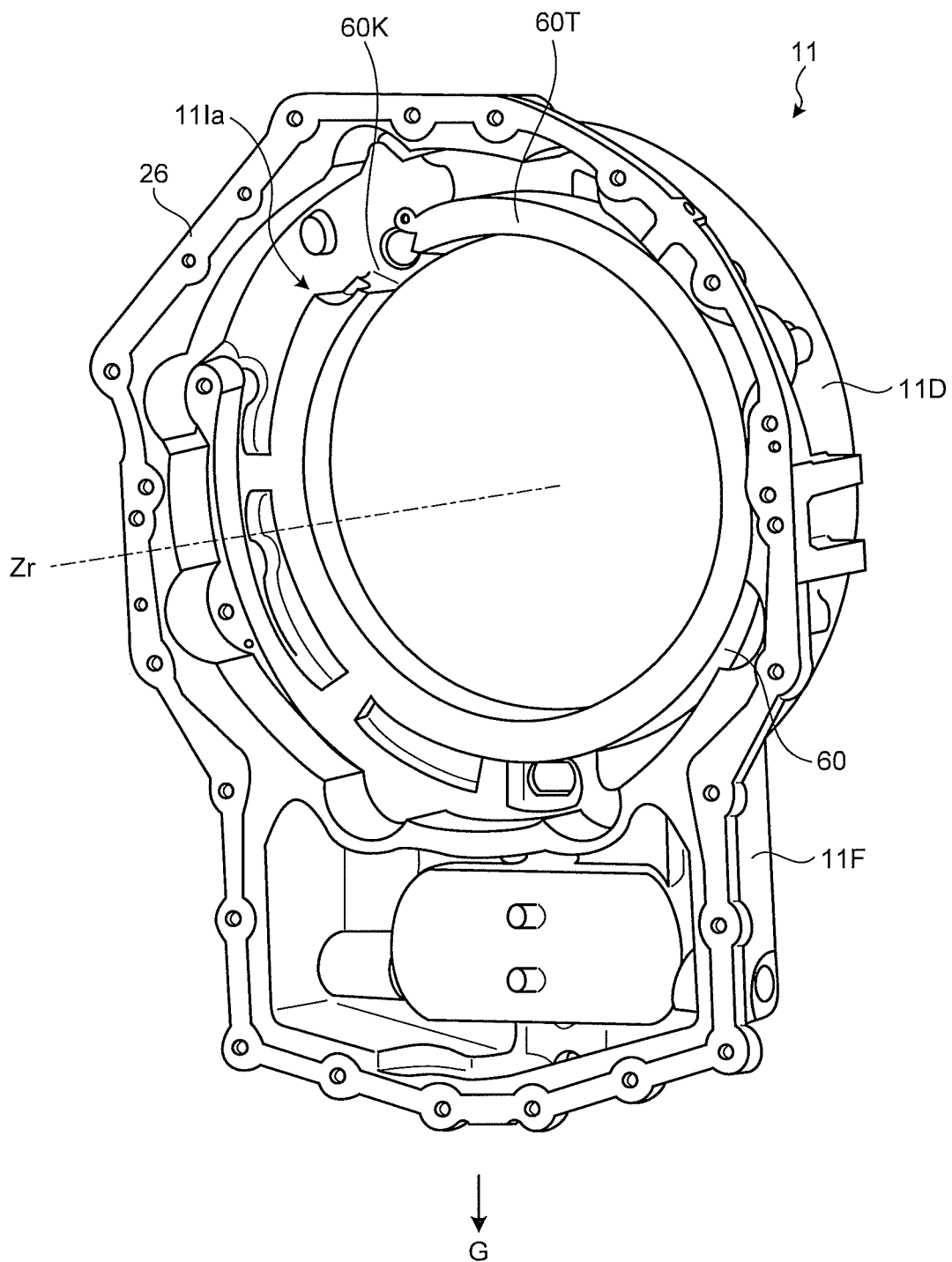
FIG. 9 is a perspective view of a first housing included in the generator motor according to the present embodiment.
Figure 10:
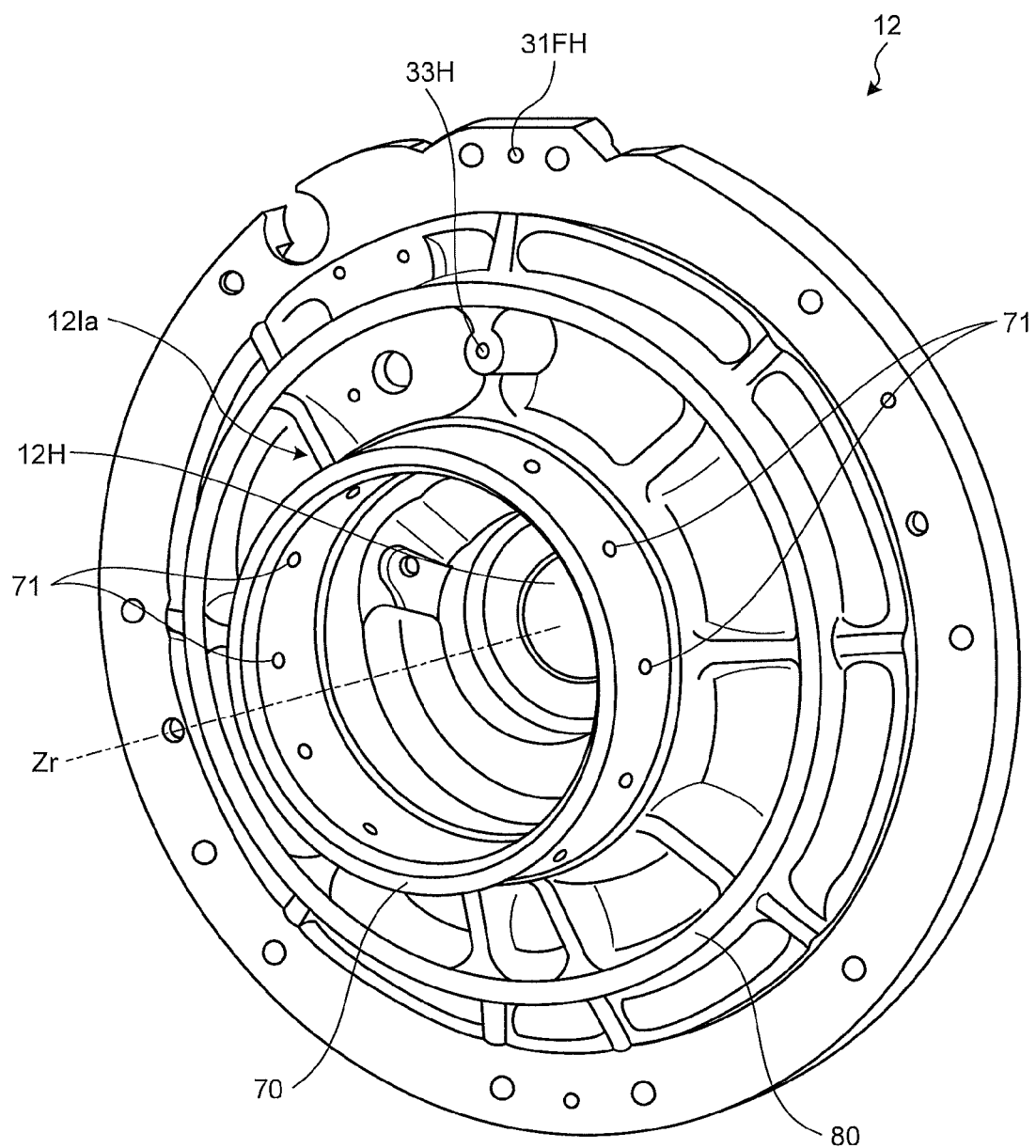
FIG. 10 is a perspective view of the flange included in the generator motor according to the present embodiment.

FIG. 3 is a cross-sectional view of the generator motor according to the present embodiment. FIG. 3 illustrates a cross-sectional surface in the case where the generator motor 10 is cut along a plane that is parallel to a central rotation axis Zr of the generator motor 10 and includes the central rotation axis Zr. FIG. 4 is an exploded view of the generator motor according to the present embodiment. FIG. 5 is a perspective view illustrating a configuration of an input/output shaft, a rotor, and a flange of the generator motor according to the present embodiment. FIG. 6 is a perspective view of a rotor core included in the generator motor according to the present embodiment. FIG. 7 is a perspective view illustrating a blade attached to the rotor core. FIG. 8 is a front view of a stator included in the generator motor according to the present embodiment. FIG. 9 is a perspective view of a first housing included in the generator motor according to the present embodiment. FIG. 10 is a perspective view of the flange included in the generator motor according to the present embodiment.

As illustrated in FIG. 2, the generator motor 10 is disposed between the internal combustion engine 6 and the hydraulic pump 7. Power is generated by the power of the internal combustion engine 6, and the power of the internal combustion engine 6 is transmitted to the hydraulic pump 7. The generator motor 10 is cooled by, for example, a cooling medium such as oil, and the cooling medium is used to lubricate lubrication-requiring portions (sliding portions) such as bearings 50F and 50R and a spline that rotatably support an input/output shaft 16.

As illustrated in FIGS. 3 and 4, the generator motor 10 includes a flywheel 14, a connection member 15, the input/output shaft 16, a rotor 20, a stator 24, a first housing 11 as a portion of a housing, a flange 12 that is disposed at one end of the housing (specifically, one end of the first housing 11) to serve as an end side member (first end side member), and a second housing 13 that is disposed at the other end of the first housing 11 to serve as a portion of the housing.

The flywheel 14 is a disk-shaped structure, and the output shaft 6S of the internal combustion engine 6 illustrated in FIG. 2 is attached to the flywheel 14. The flywheel 14 includes a starter gear 14G at an outer periphery portion thereof. The starter gear 14G is a ring gear of an external tooth. The starter gear 14G has a function of transmitting the power of a starter motor of the internal combustion engine 6 to the output shaft 6S of the internal combustion engine 6 to start the internal combustion engine 6. Also, the generator motor 10 may be operated as a motor to start the internal combustion engine 6.

<Flywheel>

The flywheel 14 is attached to the connection member 15 by a plurality of bolts 15B. The flywheel 14 has a function for improving the rotation efficiency of the internal combustion engine 6, and a function for improving the power generation efficiency and the motor efficiency of the generator motor 10. The connection member 15 includes a substantially cylindrical-shaped body portion 15S and a circular-shaped flange portion 15F that overhangs from one end side of the body portion 15S toward the radial outside of the body portion 15S. The flange portion 15F of the connection member 15 and the flywheel 14 are fastened by the bolts 15B, so that the flange portion 15F and the flywheel 14 are fixed. The body portion 15S includes an internal tooth spline 15I at an inner periphery portion thereof.

<Input/Output Shaft>

The input/output shaft 16 is a cylindrical-shaped structure. One end portion 16Tp of the input/output shaft 16 is connected to the input shaft 7S of the hydraulic pump 7, and the other end portion 16Te is connected to the output shaft 6S of the internal combustion engine 6. The input/output shaft 16 includes an internal tooth spline 16I at an inner periphery portion of the one end portion 16Tp side, and an external tooth spline 16O at an outer periphery portion of the other end portion 16Te side. The internal tooth spline 16I is meshed with an external tooth spline included in the input shaft 7S of the hydraulic pump 7. The external tooth spline 16O is meshed with the internal tooth spline 15I included in the connection member 15. By this configuration, the power of the internal combustion engine 6 is transmitted to the input/output shaft 16 through the flywheel 14 and the connection member 15, and the power of the internal combustion engine 6 transmitted to the input/output shaft 16 is transmitted to the input shaft 7S of the hydraulic pump 7 through the internal tooth spline 16I.

The input/output shaft 16 rotates around the central rotation axis Zr. The flywheel 14 and the connection member 15 also rotate around the central rotation axis Zr. The input/output shaft 16 includes a circular-shaped flange portion 16F that overhangs from the outer periphery portion toward the radial outside. The flange portion 16F is a portion to which the rotor 20 is attached, which will be described below. Also, the input/output shaft 16 includes a shaft through hole 16IS that passes through from the one end portion 16Tp toward the other end portion 16Te. The shaft through hole 16IS is a passage of a cooling medium that cools the generator motor 10. Also, the input/output shaft 16 includes two grooves 16S on the inner periphery surface, which extend from the one end portion 16Tp to the other end portion 16Te. The grooves 16S are deepened from the one end portion 16Tp toward the other end portion 16Te. By this configuration, the cooling medium flowed in from the one end portion 16Tp flows easily toward the other end portion 16Te, thus improving the cooling efficiency. In the present embodiment, although an example using the flywheel 14 has been described, the connection member 15 and the output shaft 6S of the internal combustion engine 6 may be connected by a spline or the like without using the flywheel 14.

<Rotor>

The rotor 20 includes a rotor core 17 and a rotor holder 18 that serves as a rotor core support member that holds the rotor core 17. The rotor core 17 is a structure that includes a plurality of stacked steel plates (electromagnetic steel plates). The direction in which the plurality of steel plates is stacked (stacking direction) is parallel to the central rotation axis Zr in the state where the rotor core 17 is attached to the input/output shaft 16. As illustrated in FIG. 4, the rotor core 17 includes a plurality of inductors (24 inductors in this example) 17I that protrude from an outer periphery portion at predetermined pitches in a circumferential direction. The rotor core 17 includes a plurality of bolt holes 17H that pass through toward the stacking direction in the circumferential direction. The inner periphery surface of the rotor core 17 contacts the outer periphery surface of the rotor holder 18.

The rotor holder 18 includes a first holder member 18Li, a second holder member 18Lo, and a third holder member 18T. The first holder member 18Li is a hollow disk-shaped structure. The second holder member 18Lo is a cylindrical-shaped structure that is provided at an outer periphery portion of the first holder member 18Li. The third holder member 18T is a hollow disk-shaped structure that is provided at one end portion of the second holder member 18Lo and extends toward the radial outside of the input/output shaft 16. In this embodiment, the first holder member 18Li, the second holder member 18Lo, and the third holder member 18T are fabricated as an integrated portion of the same material. The material of the rotor holder 18 is, for example, steel, but is not limited thereto. The rotor holder 18 is fastened to a flange portion 16F of the input/output shaft 16 by a bolt 16B.

The rotor holder 18 rotates around the central rotation axis Zr together with the input/output shaft 16. Also, the first holder member 18Li includes an axial through hole 18P that is parallel to the axial direction of the rotor holder 18 (the direction parallel to the central rotation axis Zr). The axial through hole 18P is a passage of the cooling medium.

The rotor core 17 is attached to an outer periphery portion of the second holder member 18Lo. In this case, a rotor core attaching bolt 19 is inserted into the bolt hole 17H of the rotor core 17 and it is inserted into a screw hole of the third holder member 18T, so that the rotor core 17 is fixed to the rotor holder 18. In the present embodiment, while the rotor core 17 is sandwiched between a first blade 40F and a second blade 40R from stacking direction both sides of the rotor core 17, the rotor core 17 is fixed to the rotor holder 18 together with the first blade 40F and the second blade 40R. Also, the first blade 40F is disposed at the flange 12 side, and the second blade 40R is disposed at the second housing 13 side. Also, a sensor plate 22 used to detect the rotation number of the input/output shaft 16 is disposed at the bold head side of the rotor core attaching bolt 19 than the first blade 40F, and it is attached to the rotor holder 18 by the rotor core attaching bolt 19. The sensor plate 22 is an annular-shaped plate, and includes a plurality of holes in a circumferential direction as illustrated in FIG. 5. By counting these holes by an optical sensor, a magnetic sensor, or the like, the rotation number of the input/output shaft 16 is detected through the rotor holder 18.

As illustrated in FIG. 6, the first blade 40F and the second blade 40R are annular-shaped members. The first blade 40F and the second blade 40R have a function of holding the rotor core 17 including a plurality of steel plates, and a function of suppressing the leakage of a magnetic flux that is generated by the stator 24 and enters the rotor core 17. Although FIG. 7 illustrates only the first blade 40F, the second blade 40R has the same shape and size as the first blade 40F with the exception of the arrangement of cooling medium outflow holes 41F and 41R and the inner diameter of a central opening portion. Therefore, with respect to the first blade 40F and the second blade 40R, only the first blade 40F will be described if necessary. Also, the first blade 40F disposed at the flange 12 side has a smaller inner diameter of the opening portion than that of the second blade 40R in order to fix the first bearing 50F and the second bearing 50R.

The first blade 40F includes a first portion 43F, a second portion 44F, and a third portion 45F. The first portion 43F is a hollow disk-shaped portion of the first blade 40F that contacts one end portion of the rotor core 17. The second portion 44F is a cylindrical-shaped portion that is provided at an outer periphery portion of the first portion 43F and extends in the opposite side to the side contacting the rotor core 17. A plurality of protrusions 46F is provided at an inner periphery portion of the second portion 44F along a circumferential direction. The protrusions 46F protrude from the inner periphery portion of the second portion 44F toward the radial inside. In the present embodiment, the protrusions 46F are substantially equally spaced in the circumferential direction of the second portion 44F. The third portion 45F is a hollow flange-shaped and disk-shaped portion that is provided at an opposite end portion of the second portion 44F to an end portion of the first portion 43F and extends toward the central rotation axis Zr. The inner diameter of the third portion 45F is larger than that of the first portion 43F.

The first portion 43F, the second portion 44F, and the third portion 45F are fabricated as an integrated portion of the same material. In the present embodiment, the first blade 40F is fabricated, for example, by aluminum alloy casting. Also, as for the first blade 40F, the first portion 43F, the second portion 44F, and the third portion 45F may be fabricated as separate members and then integrated into one body by welding, bolt fastening, or the like.

As illustrated in FIG. 3, the first blade 40F and the second blade 40R include cooling medium holding portions 42F and 42R for holding cooling medium at outer periphery portions. The cooling medium holding portion 42F is a portion that is surrounded by the first portion 43F, the second portion 44F, the third portion 45F, and the adjacent two protrusions 46F (the same is true for the second blade 40R). Also, the cooling medium holding portions 42F and the 42R may not necessarily include the protrusions 46F. Also, at the outer periphery portions, the first blade 40F and the second blade 40R include the cooling medium outflow holes 41F and 41R that pass through toward the radial outside. Also, the plurality of the cooling medium outflow holes 41F and 41R are provided along the circumferential direction of the first blade 40F and the second blade 40R. The cooling medium held by the cooling medium holding portions 42F and 42R flows out from the cooling medium outflow holes 41F and 41R by the centrifugal force caused by the rotation of the rotor 20, and is ejected toward the radial outside of the first blade 40F and the second blade 40R. It is preferable that the cooling medium outflow holes 41F and 41R are opened toward a coil end, and it is more preferable that the cooling medium outflow holes 41F and 41R are provided at positions facing the coil end. In this way, since the cooling medium can be concentrated on the coil end when ejected, the coil end can be cooled more effectively.

A rotational element of the generator motor 10 includes the flywheel 14, the connection member 15, the input/output shaft 16, the rotor holder 18, the rotor core 17, the first blade 40F, the second blade 40R, the sensor plate 22, and bolts 16B and 19 that fasten them. Next, the stator 24 will be described.

<Stator>

The stator 24 includes a stator core 24K and a coil 24C. The coil 24C is wound around the stator core 24K through an insulator 24I that is attached to the stator core 24K. The stator core 24K is an annular-shaped structure that includes a plurality of stacked annular-shaped steel plates (electromagnetic steel plates). From an inner periphery portion of the stator core 24K, a plurality of protrusions 24T protrude toward the center at predetermined pitches in a circumferential direction of the stator core 24K. The protrusion 24T is a portion of the stator core 24K. Each of the protrusions 24T is a magnetic pole of the generator motor 10. On the periphery surfaces of the respective protrusions 24T, three coils as the coil 24C are sequentially wound through the insulator 24I. A portion protruding from both end portions of the stator core 24K in the stacking direction of the annular-shaped steel plates is a coil end of the coil 24C.

The insulator 24I is a resin member, and is interposed between the coil 24C and the stator core 24K. The insulator 24I has a cutout at a portion overlapping with the coil end of the coil 24C. The cooling medium ejected from the rotating rotor 20 reaches the coil end through the cutout. In this manner, since the cutout of the insulator 24I can directly supply the cooling medium from the rotating rotor 20 to the coil end, the coil end can be cooled efficiently.

In the present embodiment, the stator core 24K includes a total of 36 protrusions 24T. By this configuration, a three-phase 12-pole SR (Switched Reluctance) motor is configured. Also, the present embodiment is not limited thereto, and the generator motor may be other types of generator motors such as PM (Permanent Magnet) motors. Six coil terminals in both end portions of three coils 24C are electrically connected to a terminal connecting portion that is provided at a connector box 26B (see FIG. 4) that is attached to a connector box seat 26 included in the housing 11. The six coil terminals are electrically connected through the terminal connecting potion to the high-voltage wiring CAa illustrated in FIG. 2.

In the outer periphery portion of the stator core 24K, bolt holes 24H are provided at a plurality of protrusion portions (three protrusion portions in the present embodiment). The respective protrusion portions are respectively fitted to concave portions formed at the inner periphery portion of the housing 11. By fitting the protrusion portions to the concave portions, the stator core 24K can be positioned with respect to the housing 11. The positioned stator core 24K is attached to the housing 11 by passing a bolt 24B through the bold hole 24H.

In the generator motor 10, the rotor 20 is disposed at the inside of the stator 24. More specifically, the rotor core 17 is disposed at the inside of the stator core 24K. By this arrangement, the inductor 17I of the rotor core 17 and the protrusion 24T of the stator core 24K face each other with a predetermined interval therebetween. As described above, there are a total of 36 protrusions 24T that are equally spaced at the inner periphery portion of the stator core 24K to constitute a magnetic pole. On the other hand, there are a total of 24 inductors 17I that are equally spaced at the outer periphery portion of the rotor core 17. In this manner, the generator motor 10 provides a pitch difference between the pitch between the respective magnetic poles (respective protrusions 24T) (that is, the number of magnetic poles (protrusions 24T) in the stator core 24K and the pitch between the respective inductors 17I in the rotor core 17. Next, the first housing 11, the flange 12, and the second housing 13 of the generator motor 10 will be described.

<First Housing>

As illustrated in FIGS. 9 and 4, the first housing 11 is a structure that includes a substantially cylindrical-shaped portion (cylindrical-shaped portion) 11D and an overhang portion 11F extending from the cylindrical-shaped portion 11D toward the radial outside, and includes opening portions at both end portions thereof. The flange 12 is attached to one end portion of the first housing 11, and the second housing 13 is attached to the other end portion of the first housing 11. The first housing 11 includes the rotor 20 and the stator 24 that is disposed at the outer periphery portion of the rotor 20 therein. More specifically, the rotor 20 and the stator 24 are disposed in the space that is surrounded by the first housing 11, the flange 12, and the second housing 13. As illustrated in FIG. 3, the portion of the overhang portion 11F is an oil pan 11P as a cooling medium saving portion that saves the cooling medium CL. A discharge passage 28 connecting the oil pan 11P and the outside is provided at the overhang portion 11F of the first housing 11. Also, the cooling medium in the oil pan 11P can be discharged from a drain.

The first housing 11 includes a protrusion portion 60 that protrudes from one end portion, that is, an inner surface (flange side inner surface) 11Ia of the attaching side of the flange 12 toward the stator 24. The protrusion portion 60 is provided at the radial outside than the first blade 40F attached to the rotor holder 18, and faces the coil 24C of the stator 24. The protrusion portion 60 is provided along the stator 24. That is, the protrusion portion 60 is provided on a concentric circle around the central rotation axis Zr. The protrusion portion 60 includes a partial cutout portion 60K at the position of the connector box seat 26. A conductive wire of the coil 24C illustrated in FIG. 3 extends from the cutout portion 60K. A top surface of the protrusion portion 60, that is, the surface facing the coil 24C is a planar surface. The cooling medium passes through a passage between the protrusion portion 60 and the coil 24C. The top surface 60T of the protrusion portion 60 is disposed at the rotor core 17 side, that is, the coil 24C side than the third portion 45F (see FIG. 6) of the first blade 40F. In this way, the cooling medium ejected from the cooling medium outflow hole 41F of the first blade 40F can be induced to the coil end of the coil 24C. As a result, the coil end can be cooled more effectively.

A cooling medium supply port 29 is attached to a top portion of the first housing 11. It is assumed that the generator motor 10 uses the overhang portion 11F as a vertical direction (gravitational direction, the direction indicated by an arrow G of FIGS. 3 and 4) side. When the overhang portion 11F of the generator motor 10 is provided toward the vertical direction, the top portion of the first housing 11 is the highest portion from the installation surface. The first housing 11 includes a cooling medium introducing passage 30 that extents from the cooling medium supply port 29 toward the central rotation axis Zr of the input/output shaft 16. At the neighborhood of one end of the cooling medium introducing passage 30, the first housing 11 includes a connection passage 31H that extends toward the flange 12 side and is opened. The connection passage 31H of the first housing 11 is connected to a connection passage 31F included in the flange 12.

A pipe 25 serving as a cooling medium returning passage is connected to the cooling medium supply port 29. The cooling medium supplied from the cooling medium supply port 29 cools the respective portions of the generator motor 10, and then is collected in the oil pan 11P. The cooling medium is sent from the discharge passage 28 through a filter and a pump (not illustrated) to an oil cooler inlet 21 illustrated in FIG. 4, and is cooled in the oil cooler inlet 21. Thereafter, the cooling medium is again supplied from an oil cooler outlet 23 through the pipe 25 to the cooling medium supply port 29. In this manner, the cooling medium circulates in the generator motor 10.

<Flange>

The flange 12 is attached to an opening portion of one end portion of the first housing 11 by a plurality of bolts 12B. As illustrated in FIG. 2, the flange 12 is disposed at the hydraulic pump 7 side. At the opposite side to the side attached to the first housing 11, the flange 12 includes a through hole 12H for attaching the input shaft 7S of the hydraulic pump 7 to the input/output shaft 16 of the generator motor 10. The input shaft 7S of the hydraulic pump 7 is attached to the input/output shaft 16 from the through hole 12H.

The through hole 12H of the flange 12 includes an overhang portion 12HF that extends toward the radial inside to the position in the middle of the internal tooth spline 16I included in the input/output shaft 16. An inner periphery portion of the overhang portion 12HF extends to the position in the middle of the internal tooth spline 16I. The overhang portion 12HF induces the cooling medium flowing out from an inner first passage 32i to the input/output shaft 16 side, and minimally suppresses the cooling medium flowing out through the through hole 12H to the hydraulic pump 7 side. In this way, the cooling medium flowing from the inside of the generator motor 10 through the through hole 12H to the outside can be minimally suppressed, and the cooling medium can be induced to the inside of the generator motor 10.

The flange 12 includes a bearing attaching member 70 that extends to the radial outside of the flange portion 16F included in the input/output shaft 16. The bearing attaching member 70 is a cylindrical-shaped member, and is integrated with the flange 12 in the present embodiment. Also, the flange 12 and the bearing attaching member 70 may be fabricated as separate members and then integrated into one body by fastening means such as bolts or joining means such as welding. The bearing attaching member 70 protrudes from a surface of the flange 12 and the housing side of the generator motor 10 illustrated in FIG. 3, that is, a surface 12Ia of the first housing 11 side (the housing side inner surface). The bearing attaching member 70 is disposed between the first holder member 18Li of the rotor holder 18, the flange portion 16F of the input/output shaft 16, and the second holder member 18Lo of the rotor holder 18.

As illustrated in FIGS. 3 and 5, at the outer periphery portion of the bearing attaching member 70, the first bearing 50F and the second bearing 50R are attached with an annular-shaped and a plate-shaped spacer 51 interposed therebetween. The spacer 51 is disposed at an outer race side of the first bearing 50F and the second bearing 50R. In the present embodiment, both the first bearing 50F and the second bearing 50R are deep-groove radial bearings, but are not limited thereto. The first bearing 50F is disposed at the flange 12 side, and the second bearing 50R is disposed at the second housing 13 side. In the present embodiment, an inner race of the first bearing 50F and the second bearing 50R is attached to the bearing attaching member 70. The bearing attaching member 70 is disposed at an outer periphery side of the input/output shaft 16. The outer race of the first bearing 50F and the second bearing 50R is attached to the inner periphery portion of the second holder member 18Lo of the rotor holder 18. By this configuration, the first bearing 50F and the second bearing 50R are interposed between the bearing attaching member 70 and the rotor holder 18. The bearing attaching member 70 rotatably supports the rotor holder 18, the input/output shaft 16, the connection member 15, and the flywheel 14 through the first bearing 50F and the second bearing 50R.

Since the spacer 51 is interposed between the first bearing 50F and the second bearing 50R at the outer race thereof, a gap corresponding to the thickness of the spacer 51 is present therebetween. The bearing attaching member 70 includes a through hole 71 opened between the position of the gap. The through hole 71 is a cooling medium passage, and supplies a cooling medium to the first bearing 50F and the second bearing 50R through the gap.

The flange 12 includes a rib (circumferential rib) 80 that is disposed at the radial outside of the bearing attaching member 70, and at the radial inside than the first blade 40F attached to the rotor holder 18, and protrudes toward the first blade 40F. The circumferential rib 80 is a cylindrical-shaped member that is formed at a concentric circle around the central rotation axis Zr. Also, the flange 12 includes a plurality of radial ribs 81 that extend radially toward the radial outside of the bearing attaching member 70. In the present embodiment, the circumferential rib 80 and the radial rib 81 are integrated with the flange 12. Also, the flange 12 and the circumferential rib 80 may be fabricated as separate members and then integrated into one body by fastening means such as bolts or joining means such as welding. Among the plurality of radial ribs 81, a radial rib, which is parallel to the horizontal direction when the oil pan 11P of the generator motor 1 is installed at the vertically direction side, that is, toward the downward direction, will be referred to as a horizontal rib 81H if necessary.

The circumferential rib 80 faces the rotor 20. A top surface of the circumferential rib 80, that is, the surface facing the rotor 20 is a planar surface. A space between the circumferential rib 80 and the rotor 20 is a cooling medium passage. The top surface of the circumferential rib 80 overlaps with a portion of the first blade 40F in the direction parallel to the central rotation axis Zr of the input/output shaft 16. That is, the top surface of the circumferential rib 80 is disposed at the rotor 20 side (cooling medium holding portion 42F side) than the edge surface of the first blade 40F in the flange 12 side. In this way, the cooling medium can be more securely introduced into the cooling medium holding portion 42F of the first blade 40F.

The flange 12 includes the connection passage 31F connected to the connection passage 31H of the first housing 11, a first passage 32 connected to the connection passage 31F, and a second passage 33 branching from the first passage 32. As illustrated in FIG. 10, the connection passage 31F is opened to a portion of the outer periphery portion of the flange 12. This opening is an inlet 31FH of the connection passage 31F. The first passage 32 includes an outer first passage 32o and the inner first passage 32i that is connected to the outer first passage 32o and has a smaller inner diameter than the outer first passage 32o. Also, the inner first passage 32i is disposed at the input/output shaft 16 side than the outer first passage 32o. The inner first passage 32i of the first passage 32 is opened to the input/output shaft 16 side of the flange 12, more specifically, to an overlap portion between a portion of the input/output shaft 16 and the flange 12 in the central rotation axis Zr direction. An opening portion of the inner first passage 32i in the input/output shaft 16 side is a first passage outlet 32H.

The second passage 33 branches from the outer first passage 32o. That is, the second passage 33 branches before the inner diameter of the first passage 32 decreases. The second passage 33 extends toward the rotor 20 attached to the outside of the input/output shaft 16, and is opened to the rotor 20 side of the flange 12. A portion branching from the first passage 32 is a second passage inlet, and an opening portion of the second passage 33 in the rotor 20 side is a second passage outlet 33H (see FIGS. 3 and 10).

<Second Housing>

The second housing 13 is attached to an opening portion of the other end portion of the first housing 11. The second housing 13 is disposed at the internal combustion engine 6 side illustrated in FIG. 2. At the opposite side to the side attached to the first housing 11, the second housing 13 includes a through hole 13H for attaching the output shaft 6S of the internal combustion engine 6 to the input/output shaft 16 of the generator motor 10. The output shaft 6S of the internal combustion engine 6 is attached to the flywheel 14 from the through hole 13H. Next, a cooling medium path in the generator motor 10 will be described.

<Cooling Medium Path>

The cooling medium flowing in from the cooling medium supply port 29 flows into the first passage 32 through the cooling medium introducing passage 30 and the connection passages 31H and 31F. A portion of the cooling medium flowing into the first passage 32 branches to the second passage 33, and the other portion flows through the inner first passage 32i and flows out from the first passage outlet 32H. A portion of the cooling medium flowing out from the first passage outlet 32H flows into the shaft through hole 16IS from between the internal tooth spline 16I of the input/output shaft 16 and the external tooth spline of the input shaft 7S of the hydraulic pump 7 illustrated in FIG. 2. The other portion flows from the through hole 71 of the bearing attaching member 70, through the space between the input/output shaft 16 and the flange 12 and the space between the input/output shaft 16 and the bearing attaching member 70, into the gap between the first bearing 50F and the second bearing 50R.

It is preferable that the first passage outlet 32H is opened at the position of the one end portion 16Tp of the input/output shaft 16. That is, it is preferable that the first passage outlet 32H is opened to the position of a connection portion between the input/output shaft 16 and the input shaft 7S of the hydraulic pump 7 that is driven by the internal combustion engine 6. In this way, a cooling medium can be supplied between the input/output shaft 16 and the input shaft 7S of the hydraulic pump 7, more specifically, between the internal tooth spline 16I of the input/output shaft 16 and the external tooth spline of the input shaft 7S of the hydraulic pump 7 illustrated in FIG. 2. As a result, the cooling medium can be efficiently introduced into the shaft through hole 16IS. Also, as described above, since the overhang portion 12HF including the through hole 12H of the flange 12 restricts the cooling medium CL, which flows out from the outlet 32H, from flowing into the hydraulic pump 7 side, the cooling medium CL can be efficiently introduced into the shaft through hole 16IS.

The cooling medium flowing into the gap between the first bearing 50F and the second bearing 50R cools and lubricates the first bearing 50F and the second bearing 50R, and a portion thereof flows in between the bearing attaching member 70 and the circumferential rib 80. The remaining cooling medium passes through the axial through hole 18P included in the first holder member 18Li of the rotor holder 18. The cooling medium flowing in between the bearing attaching member 70 and the circumferential rib 80 flows into the cooling medium holding portion 42F of the first blade 40F, and then flows out from the cooling medium outflow hole 41F of the cooling medium holding portion 42F. This cooling medium is ejected to the radial outside of the rotor 20 by the centrifugal force caused by the rotation of the rotor 20, and is scattered on the coil end of the coil 24C to cool the coil end. The cooling medium having cooled the coil end is collected in the oil pan 11P.

The cooling medium having passed through the axial through hole 18P of the first holder member 18Li flows along the third holder member 18T of the rotor holder 18, flows into the cooling medium holding portion 42R of the second blade 40R, and then flows out from the cooling medium outflow hole 41R of the cooling medium holding portion 42R. This cooling medium is ejected to the radial outside of the rotor 20 by the centrifugal force caused by the rotation of the rotor 20, and is scattered on the coil end of the coil 24C to cool the coil end. The cooling medium having cooled the coil end is collected in the oil pan 11P.

The cooling medium having flowed into the shaft through hole 16IS flows from the one end portion 16Tp of the input/output shaft 16 toward the other end portion 16Te and flows out from the other end portion 16Te. This cooling medium flows out between the connection member 15 and the rotor holder 18 through the space between the external tooth spline 16O of the input/output shaft 16 and the internal tooth spline 15I of the connection member 15. The cooling medium flows along the first holder member 18Li and the third holder member 18T of the rotor holder 18 to the radial outside, flows into the cooling medium holding portion 42R of the second blade 40R, and then flows out from the cooling medium outflow hole 41R of the cooling medium holding portion 42R. This cooling medium is ejected to the radial outside of the rotor 20 by the centrifugal force caused by the rotation of the rotor 20, and is scattered on the coil end of the coil 24C to cool the coil end. The cooling medium having cooled the coil end is collected in the oil pan 11P.

The cooling medium having passed through the second passage 33 flows out from the second passage outlet 33H and flows toward the rotor 20. This cooling medium having reached the rotor 20 is ejected to the radial outside of the rotor 20 by the centrifugal force caused by the rotation of the rotor 20, and is scattered on the coil end of the coil 24C at the flange 12 side to cool the coil end. The cooling medium having cooled the coil end flows downward by gravitation and is collected in the oil pan 11P. The cooling medium collected in the oil pan 11P is sent from the discharge passage 28 through a filter and a pump (not illustrated) to the oil cooler inlet 21 illustrated in FIG. 4, and is cooled in the oil cooler inlet 21. Thereafter, the cooling medium is again supplied from the oil cooler outlet 23 through the pipe 25 to the cooling medium supply port 29.

Figure 11:
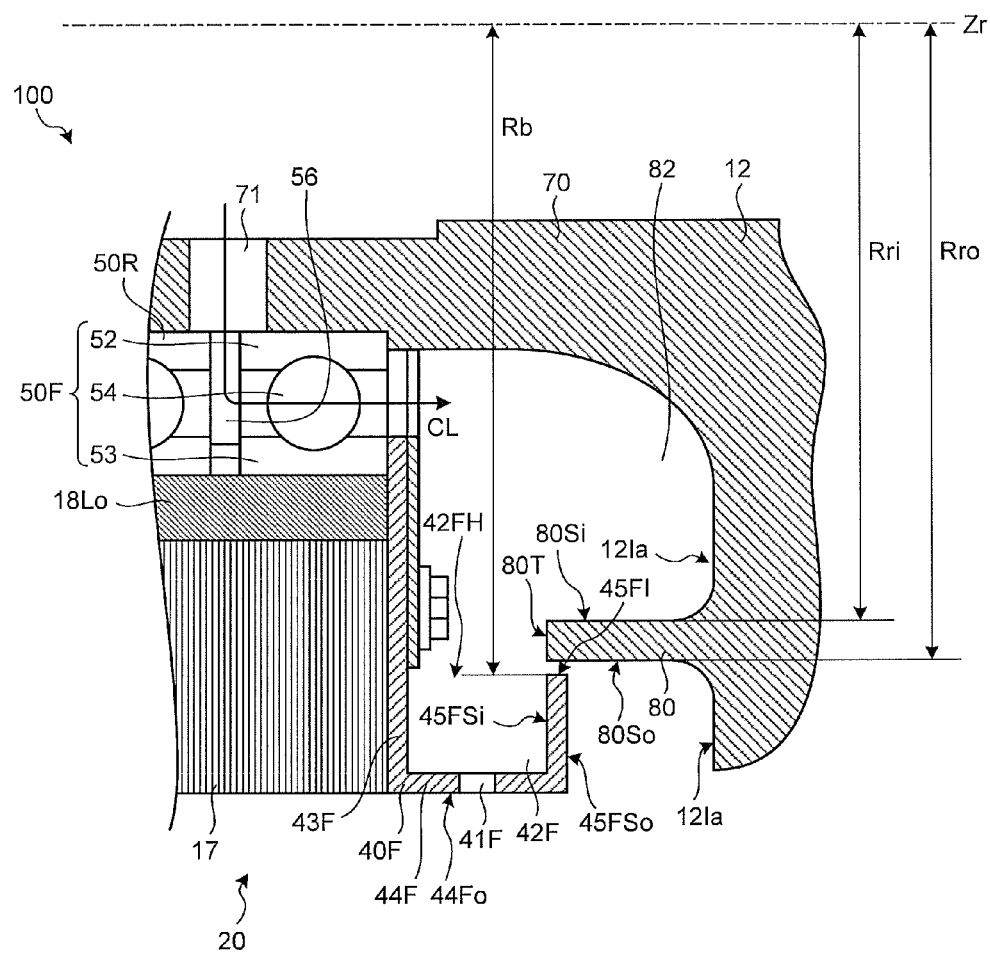
FIG. 11 is a view illustrating a generator motor cooling structure according to the present embodiment.

FIG. 11 is a view illustrating the generator motor cooling structure according to the present embodiment. A generator motor cooling structure according to the present embodiment (hereinafter, referred to as cooling structure if necessary) 100 is configured to cool the generator motor 1, which includes a housing storing the input/output shaft 16 to which the rotor 20 is attached and the stator 24 disposed at the outer periphery portion of the rotor 29, by a cooling medium. Therefore, the cooling structure 100 includes the circumferential rib 80 serving as a protrusion portion that protrudes toward the rotor 20 from a surface (housing side inner surface) 12Ia of the first housing 11 side of the flange 12 serving as an end side member disposed at one end portion of the first housing 11 as a housing in the direction of the central rotation axis Zr of the input/output shaft 16. The circumferential rib 80 is provided in a radial inside of the coil 24C of the stator 24, at a position of a radial outside of the bearing (first bearing 50F, second bearing 50R) attached to the input/output shaft 16, in at least a partial region in the neighborhood of the central rotation axis Zr.

A portion of the cooling medium CL flowing into a bearing gap 56 through the through hole 71 of the bearing attaching member 70 provided at the flange 12 passes through a space between an outer race 52 and an inner race 53 of the first bearing 50F and a rolling body 54 to lubricate and cool the first bearing 50F. The cooling medium CL having lubricated and cooled the first bearing 50F flows into a space (a circumferential rib inner space) 82 formed between the bearing attaching member 70 and the circumferential rib 80. A portion of this cooling medium CL flows toward the first blade 40F, and the remaining portion flows to the flange 12 side. A portion of the cooling medium CL not flowing toward the first blade 40F may flow to the oil pan 11P without assisting in cooling the coil 24C. The cooling structure 100 efficiently supplies the cooling medium CL, which flows to the oil pan 11P without assisting in cooling the coil 24C, to the coil 24C of the stator 24 (more specifically, the coil end) to suppress the insufficient cooling of the coil 24C. For this purpose, by the circumferential rib 80 provided between the coil 24C of the stator 24 and the first bearing 50F, the cooling structure 100 collects the cooling medium CL inside the circumferential rib inner space 82 and induces to the coil 24C. In this way, the cooling structure 100 can suppress the insufficient cooling of the coil 24C.

In the present embodiment, as illustrated in FIG. 10, the circumferential rib 80 is an annular-shaped portion that is provided in the radial outside of the bearing attaching member 70 and protrudes from the housing side inner surface 12Ia.

The circumferential rib 80 includes a top surface 80T, a side portion (outer side portion) 80So of the radial outside, and a side portion (inner side portion) 80Si of the radial inside. The top surface 80T corresponds to an end portion of the circumferential rib 80 in the direction of the central rotation axis Zr. The outer side portion 80So is a portion that connects the housing side inner surface 12Ia of the radial outside and the top surface 80T. The inner side portion 80Si is a portion that connects the housing side inner surface 12Ia of the radial inside and the top surface 80T. In the present embodiment, the top surface 80T is a planar surface that is parallel to a planar surface perpendicular to the central rotation axis Zr. The top surface 80T faces the first blade 40F that is attached to one end portion of the rotor core 17 included in the rotor 20.

As described above, the first blade 40F includes the cooling medium holding portion 42F at an outer periphery portion thereof. The cooling medium holding portion 42F is a portion that is surrounded by the first portion 43F, the second portion 44F, and the third portion 45F. Since the second portion 44F and the third portion 45F are provided at the outer periphery portion of the first blade 40F, the cooling medium holding portion 42F is provided at the outer periphery portion of the first blade 40F. The cooling medium holding portion 42F is opened to the radial inside of the first blade 40F. An opening portion 42FH of the cooling medium holding portion 42F is a portion that introduces the cooling medium into the cooling medium holding portion 42F. The position of the opening portion 42FH is the position of a radial inner end portion 45FI of the third portion 45F included in the first blade 40F.

In the present embodiment, the circumferential rib 80 is disposed at the radial inside than the opening portion 42FH of the cooling medium holding portion 42F. That is, a radius (distance from the central rotation axis Zr) Rro of the outer side portion 80So of the circumferential rib 80 is smaller than a radius (distance from the central rotation axis Zr) Rb of the radial inner end portion 45FI of the third portion 45F included in the first blade 40F. That is, a radius (distance from the central rotation axis Zr) Rri of the inner side portion 80Si of the circumferential rib 80 is also smaller than the radius Rb of the radial inner end portion 45FI of the third portion 45F. Also, in the present embodiment, the top surface 80T of the circumferential rib 80 is located at an opening (opening portion 42FH) side of the cooling medium holding portion 42F than an end portion of the circumferential rib 80 side of the cooling medium holding portion 42F. An outer side surface (side surface opposite to the rotor core 17) 45FSo of the third portion 45F corresponds to an end portion of the circumferential rib 80 side of the cooling medium holding portion 42F. Also, the top surface 80T of the circumferential rib 80 may be located at the opening (opening portion 42FH) side of the cooling medium holding portion 42F than an inner side surface (side surface of the rotor core 17 side) 45FSi of the third portion 45F.

By this configuration, the cooling medium CL in the circumferential rib inner space 82 flows along the inner side portion 80Si of the circumferential rib 80 and flows from the opening portion 42FH of the cooling medium holding portion 42F into the cooling medium holding portion 42F. The cooling medium CL having flowed into the cooling medium holding portion 42F is ejected from the cooling medium outflow hole 41F to the radial outside by the centrifugal force caused by the rotation of the rotor 20, to cool the coil 24C (specifically, the coil end).

In this manner, in the cooling structure 100, the circumferential rib 80 collects the cooling medium CL having passed through the first bearing 50F, induces the cooling medium CL to the cooling medium holding portion 42F of the first blade 40F, and ejects the cooling medium CL from the cooling medium outflow hole 41F of the cooling medium holding portion 42F to the coil end, so that the cooling medium can be securely supplied to the coil end to cool the coil end. As a result, the cooling structure 100 can suppress the insufficient cooling of the coil 24C included in the stator 24 when cooling the generator motor 1 by the cooling medium.

In the present embodiment, the circumferential rib 80 and the flange 12 are fabricated with the same material. In the present embodiment, the flange 12 and the circumferential rib 80 are fabricated with casting iron. Since the casting iron is a magnetic material, when the circumferential rib 80 excessively approaches the rotor core 17, the leaking magnetic flux of the rotor core 17 increases, which may cause the performance degradation of the generator motor 1. When the circumferential rib 80 approaches the first blade 40F, the cooling medium can be easily induced to the cooling medium holding portion 42F of the first blade 40F. Since the first blade 40F has a function of reducing the leaking magnetic flux from the rotor core 17, even when the circumferential rib 80 approaches to the first blade 40F, the leaking magnetic flux hardly increases. Therefore, by approaching the circumferential rib 80 to the first blade 40F, the cooling structure 100 can efficiently induce the cooling medium to the cooling medium holding portion 42F.

Figure 12:
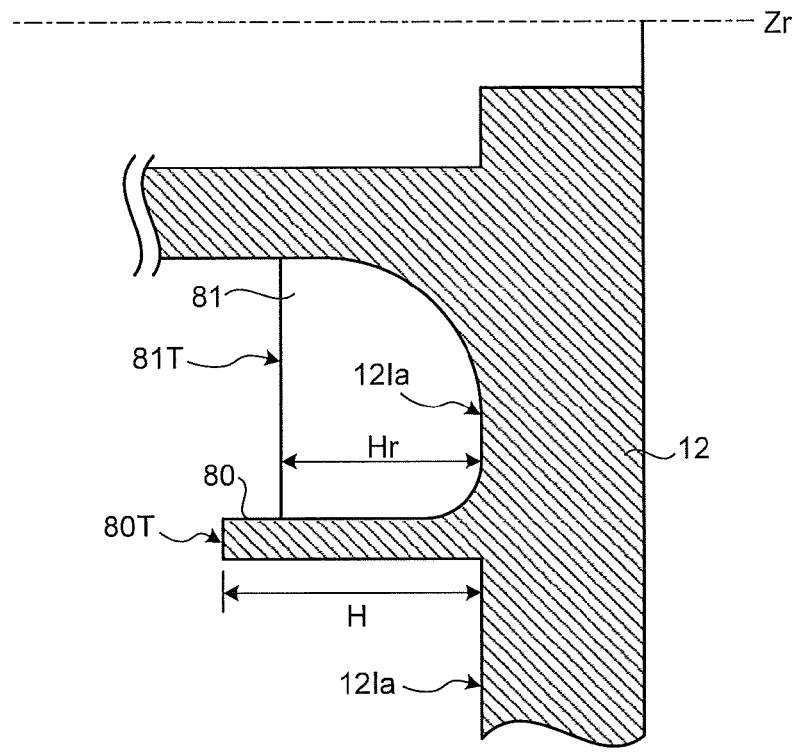
FIG. 12 is a partial cross-sectional view illustrating a relation between a circumferential rib and a radial rib.

FIG. 12 is a partial cross-sectional view illustrating a relation between the circumferential rib and the radial rib. It is preferable that a height H of the circumferential rib 80, that is, a size from the housing side inner surface 12Ia to the top surface 80T of the circumferential rib 80 is higher than a height Hr of the radial rib, that is, a size from the housing side inner surface 12Ia to a top surface 81T of the radial rib 81. In this way, preferably, the cooling medium CL can easily flow over the radial rib 81 along the circumferential direction of the circumferential rib 80.

Figure 13:
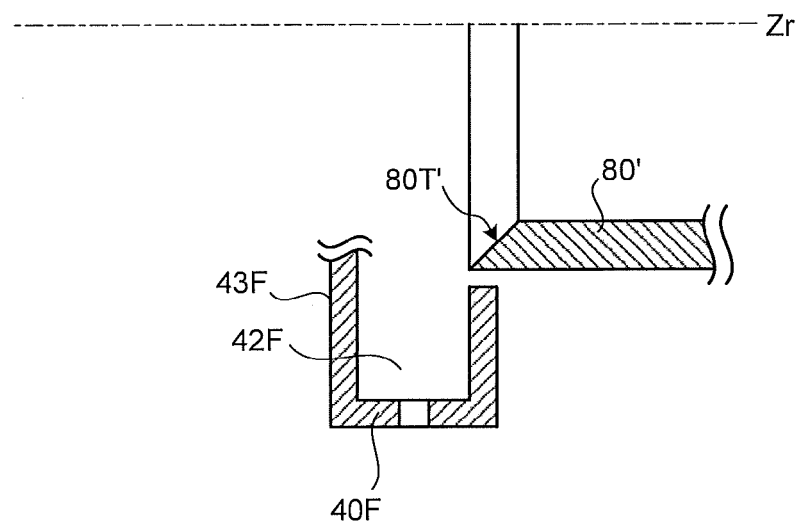
FIG. 13 is a view illustrating a modified example of the circumferential rib.

FIG. 13 is a view illustrating a modified example of the circumferential rib. The distance of a top surface 81T' of a circumferential rib 80' to the first portion 43F of the first blade 40F decreases toward the radial outside. In this manner, the top surface 81T' of the circumferential rib 80' is inclined with respect to a planar surface perpendicular to the central rotation axis Zr. In this way, the cooling medium CL can be smoothly flowed from the circumferential rib 80' to the cooling medium holding portion 42F.

Figure 14:
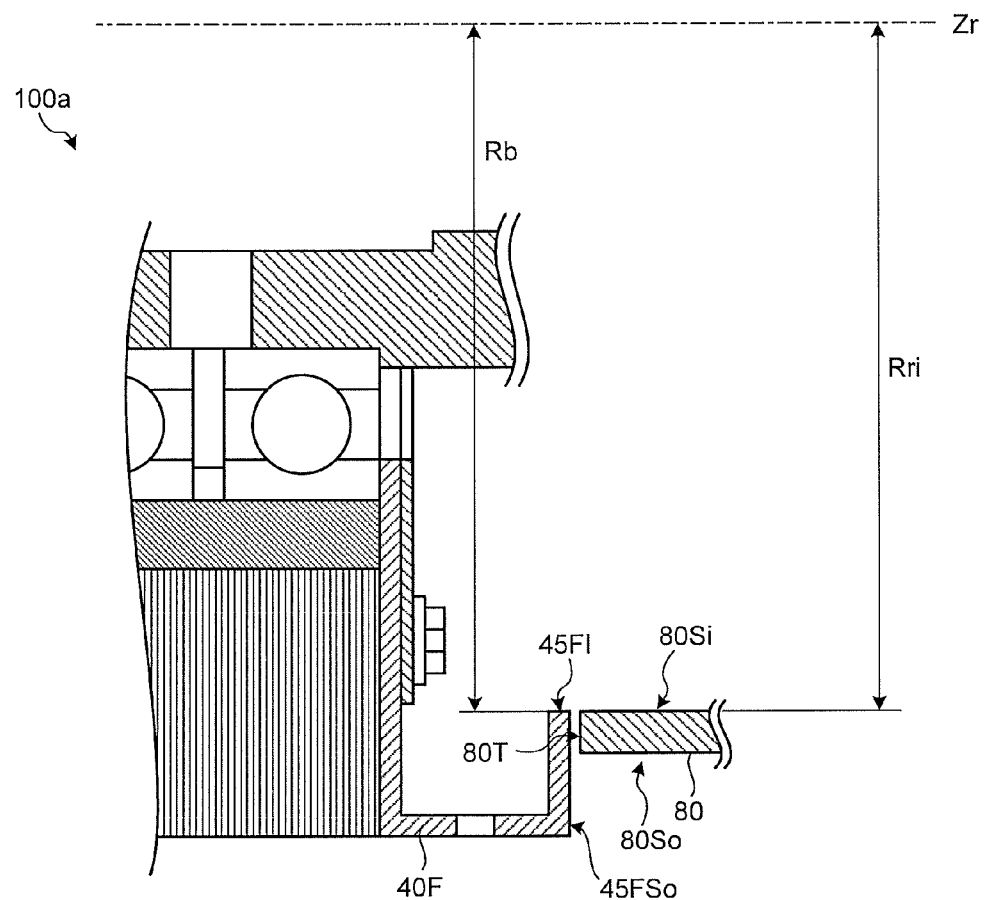
FIG. 14 is a view illustrating a cooling structure according to a modified example of the present embodiment.

FIG. 14 is a view illustrating a cooling structure according to a modified example of the present embodiment. A cooling structure 100a is configured such that a top surface 80T of a circumferential rib 80 faces at least a portion of an outer side surface 45FSo of a third portion 45F. In this case, it is preferable that a radius Rri of an inner side portion 80Si of the circumferential rib 80 is equal to a radius Rb of a radial inner end portion 45FI of the third portion 45F, that is, the inner side portion 80Si and the radial inner end portion 45FI are located on the same plane. In this way, a portion of the cooling medium CL having flowed into the inner side portion 80Si of the circumferential rib 80 flows between the top surface 80T of the circumferential rib 80 and the outer side surface 45FSo of the third portion 45F, and the other portion flows into the cooling medium holding portion 42F of the first blade 40F. The cooling medium CL having flowed between the top surface 80T of the circumferential rib 80 and the outer side surface 45FSo of the third portion 45F is ejected to the radial outside by the centrifugal force of the rotating first blade 40F to cool the coil end. By this configuration, the cooling medium can also be securely supplied to the coil end to cool the coil end. As a result, the cooling structure 100a can suppress the insufficient cooling of a coil 24C included in a stator 24 when cooling a generator motor 1 by the cooling medium.

In the cooling structure 100a, the radius Rri of the inner side portion 80Si of the circumferential rib 80 may be greater than the radius Rb of the radial inner end portion 45FI of the third portion 45F, that is, the inner side portion 80Si is located at the radial outside than the radial inner end portion 45FI. In this case, the cooling medium CL having flowed into the inner side portion 80Si of the circumferential rib 80 flows between the top surface 80T of the circumferential rib 80 and the outer side surface 45FSo of the third portion 45F. Depending on the amount of cooling medium CL, a portion of the cooling medium CL having flowed into the inner side portion 80Si of the circumferential rib 80 flows into the cooling medium holding portion 42F of the first blade 40F. The cooling medium CL having flowed between the top surface 80T of the circumferential rib 80 and the outer side surface 45FSo of the third portion 45F is ejected to the radial outside by the centrifugal force of the rotating first blade 40F to cool the coil end. By this configuration, the cooling medium can also be securely supplied to the coil end to cool the coil end. As a result, the cooling structure 100a can suppress the insufficient cooling of the coil 24C included in the stator 24 when cooling the generator motor 1 by the cooling medium.

Figure 15:
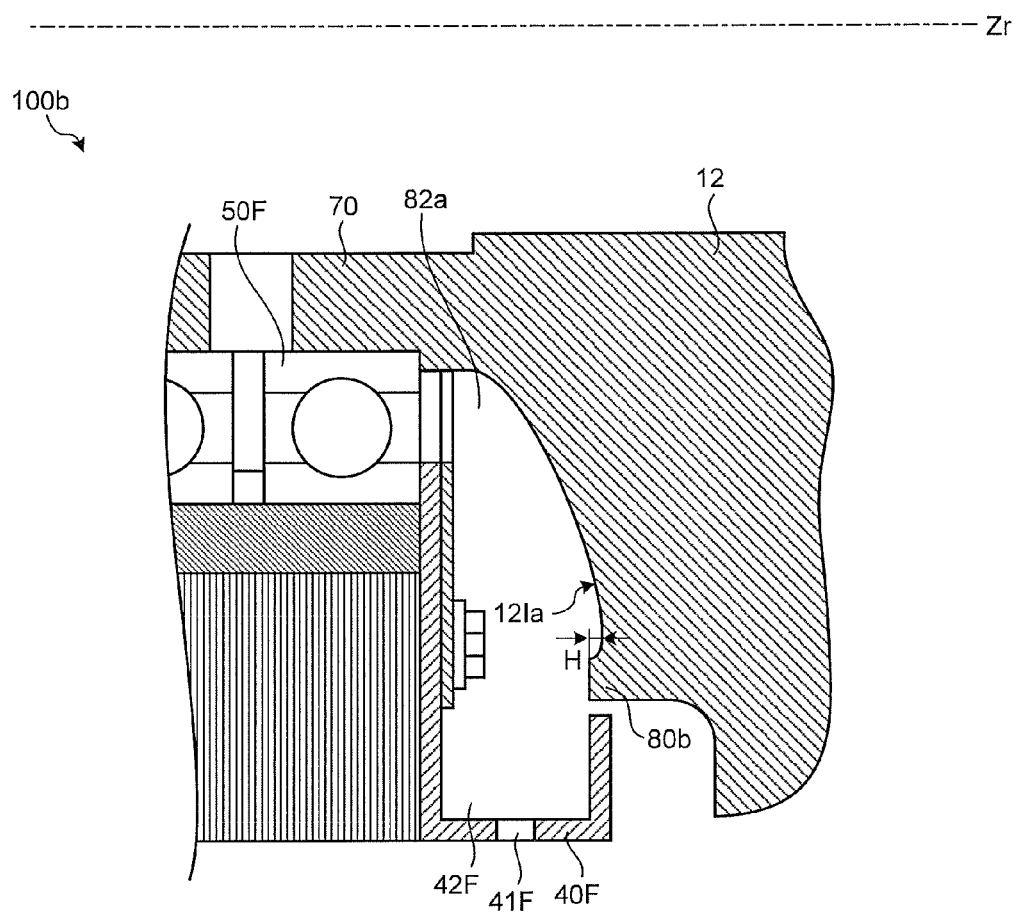
FIG. 15 is a view illustrating a cooling structure according to a modified example of the present embodiment.

FIG. 15 is a view illustrating a cooling structure according to a modified example of the present embodiment. In the modified example, the cooling medium CL having passed through a first bearing 50F can be induced to the coil 24C. The circumferential rib may be any type as long as it has this function. A cooling structure 100b has a smaller circumferential rib inner side space 82a than those of the above-described cooling structures 100 and 100a. Accordingly, the height H of the circumferential rib 80 is also smaller. The cooling structure 100b can also induce the cooling medium CL having passed through the first bearing 50F to the cooling medium holding portion 42F of the first blade 40F, eject the cooling medium from the cooling medium outflow hole 41F to the radial outside, and cool the coil end. In the modified example, the height H of the circumferential rib 80 may be 0.

Figure 16:
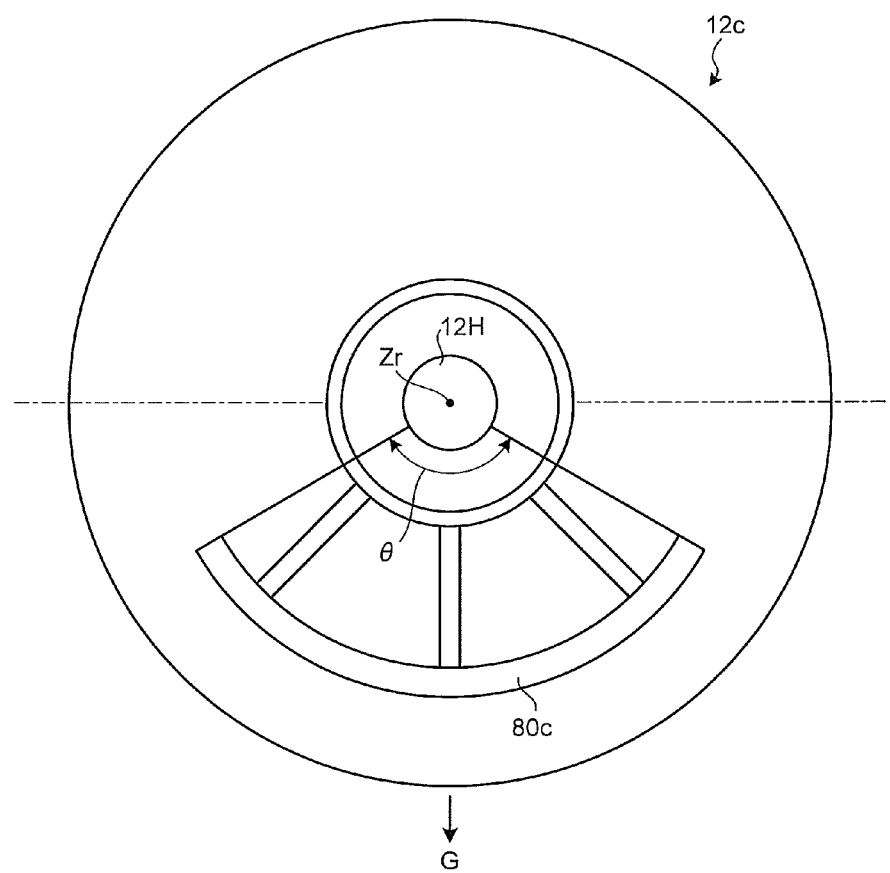
FIG. 16 is a front view of a flange illustrating a range in which the circumferential rib is provided.

FIG. 16 is a front view of the flange illustrating a range in which the circumferential rib is provided. A circumferential rib 80c of a flange 12c illustrated in FIG. 16 is provided within the range of a central angle θ (<360 degrees) around the central rotation axis Zr. That is, the circumferential rib 80c extends not in an entire region but in a partial region around the central rotation axis Zr. In this case, when the oil pan 11P of the generator motor 1 is installed at the vertical direction side, that is, toward the downward side (the direction indicated by an arrow G of FIG. 16), it is preferable that the circumferential rib 80c is provided a lower side predetermined region (a region around θ=120 degrees in the present embodiment).

The above-described circumferential ribs 80 and 80b collect the cooling medium CL having passed through the first bearing 50F by gravitation, and induce the cooling medium CL to the cooling medium holding portion 42F of the first blade 40F. Therefore, even when the circumferential rib 80c is disposed at only a portion of the downward side of the flange 12, the circumferential ribs 80 and 80b can collect the cooling medium CL having passed through the first bearing 50F, and induce the cooling medium CL to the cooling medium holding portion 42F of the first blade 40F. In this way, since the circumferential rib need not be provided in the entire region around the central rotation axis Zr, the weight of the flange 12 can be reduced. In this case, the circumferential rib 80c may be provided at the lower half portion (θ is equal to or smaller than 180 degrees) of the flange 12.

Figure 17:
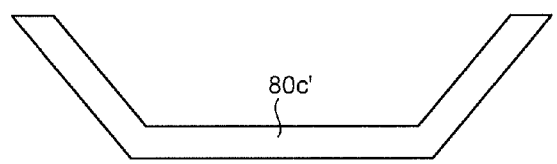
FIG. 17 is a view illustrating a modified example of the circumferential rib.

FIG. 17 is a view illustrating a modified example of the circumferential rib. When the circumferential rib is provided at a partial region among the neighborhood of the central rotation axis Zr, the circumferential rib 80c illustrated in FIG. 16 is arc-shaped. However, in this case, the circumferential rib may not be arc-shaped. For example, like a circumferential rib 80c' illustrated in FIG. 17, the circumferential rib may have a combination of three linear ribs.

Figure 18:
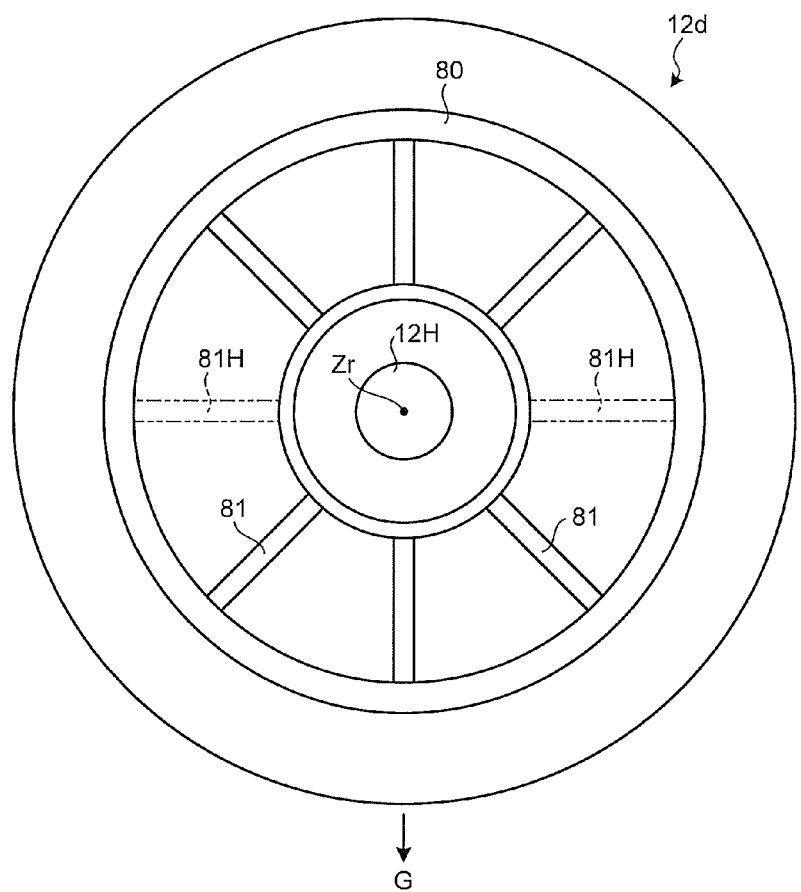
FIG. 18 is a view illustrating an arrangement of the radial rib.

FIG. 18 is a view illustrating an arrangement of the radial rib. A flange 12d is the one from which two horizontal ribs 81H illustrated in FIG. 10 are removed. By removing the horizontal ribs 81H, the cooling medium CL can be easily flowed along the circumferential rib 80. As a result, by the gravitation, the cooling medium CL can be induced to the cooling medium holding portion 42F of the first blade 40F. Also, since the horizontal ribs 81H are removed, the weight of the flange 12 can be reduced accordingly.

Figure 19:
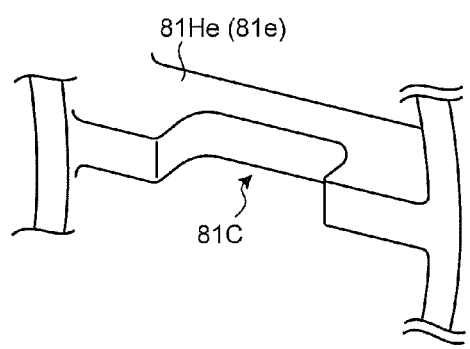
FIG. 19 is a modified example of the radial rib.

FIG. 19 is a modified example of the radial rib. A vertical rib 81e or a horizontal rib 81He may include a cutout 81C. Since the cooling medium CL passes through the cutout 81C, the cooling medium CL can be easily flowed along the circumferential rib 80. As a result, by the gravitation, the cooling medium CL can be induced to the cooling medium holding portion 42F of the first blade 40F. Also, the weight of the flange 12 can be reduced by the cutout 81C.

In the present embodiment, the circumferential rib may be provided in the entire region around the central rotation axis Zr. In this way, in the upper direction of the flange 12, the cooling medium, which has been flowed out from the first bearing 50F and ejected to the radial outside by the rotation of the rotor is induced to the cooling medium holding portion 42F of the first blade 40F by the circumferential rib. By the rotation of the first blade 40F, the cooling medium of the cooling medium holding portion 42F is ejected from the cooling medium outflow hole 41F to the coil end to cool the coil end. In this manner, when the circumferential rib is provided in the entire region around the central rotation axis Zr, the coil 24C can be uniformly cooled in the entire circumferential region of the stator 24.

In the present embodiment and the modified example thereof, the generator motor 10 also has a function of transmitting the power of the internal combustion engine 6 to the hydraulic pump 7. In this manner, the generator motor 10 has a function of generating power by input power and transmitting the input power to other targets to be driven. For this purpose, the generator motor 10 is disposed between the internal combustion engine 6 and the hydraulic pump 7. In this arrangement, it is preferable that the size in the direction parallel to the central rotation axis Zr is minimized such that the internal combustion engine 6, the generator motor 10, and the hydraulic pump 7 can be easily mounted on a vehicle. For this purpose, by the first bearing 50F and the second bearing 50R, the generator motor 10 rotatably supports not both end portions of the input/output shaft 16 but the central portion of the input/output shaft 16. In this configuration, for example, since a radial load is applied to the end portion of the input/output shaft 16, when a moment is applied to rotate the input/output shaft 16 around the first bearing 50F and the second bearing 50R, a large load is applied to the first bearing 50F and the second bearing 50R. Therefore, in the generator motor 10, the input/output shaft 16 may be easily rotated around the first bearing 50F and the second bearing 50R by the radial load, and a vibration and noise may be increased due the rotation.

In the cooling structure 100, since the flange 12 includes the circumferential rib 80, the strength and rigidity of the flange 12 supporting the first bearing 50F and the second bearing 50R can be improved. Therefore, the generator motor 10 including the cooling structure 100 improves the rigidity of a portion supporting a rotating system, thus reducing the vibration and noise. In this manner, it is preferable that the cooling structure 100 is disposed between the power generating source and a driving target of the power generating source together with the generator motor 10 and has a function for transmitting the power of the power generating source to the driving target.

REFERENCE SIGNS LIST 1 hybrid hydraulic shovel
2 lower running body
3 upper turning body
6 internal combustion engine
6S output shaft
7 hydraulic pump
7S input shaft
10 generator motor
11 first housing
12 flange
13 second housing
14 flywheel
15 connection member
16 input/output shaft
17 rotor core
18 rotor holder
18Li first holder member
18Lo second holder member
18T third holder member
20 rotor
24 stator
24C coil
24I insulator
24K stator core
32 first passage
32i inner first passage
32o outer first passage
32H first passage outlet
33 second passage
33 second passage
33H second passage outlet
33I second passage inlet
40F first blade
40R second blade
42FH opening portion
50F first bearing
50R second bearing
60 protrusion portion
60K cutout portion
70 bearing attaching member
71 through hole
80 rib (circumferential rib)
80, 80', 80c circumferential rib
80Si inner side portion
80So outer side portion
80T top surface
81, 81e Radial rib
81H, 81He horizontal rib
81T top surface
82, 82a circumferential rib inner space
100 generator motor lubricating structure (cooling structure)
Zr central rotation axis

The invention claimed is:

1. A generator motor cooling structure for cooling a generator motor, which includes a housing storing an input/output shaft to which a rotor is attached and a stator disposed at an outer periphery portion of the rotor, by a cooling medium, comprising:
a protrusion portion that protrudes toward a rotor core disposed at an outer periphery portion of the rotor from a surface at a side of the housing of an end side member disposed at one end portion of the housing in a direction of a central rotation axis of the input/output shaft;
an annular-shaped blade that is provided at an end portion of the rotor in the direction of the central rotation axis;
a cooling medium holding portion that is provided at an outer periphery portion of the blade, is opened to an inner side of the blade in the radial direction, and holds the cooling medium cooling the generator motor; and
a cooling medium outflow hole that is provided at the blade and passes the cooling medium held by the cooling medium holding portion to an outer side in the radial direction,
wherein the protrusion portion is provided on an inner side of a coil of the stator in a radial direction, on an outer side of a bearing attached to the input/output shaft in the radial direction, in at least a partial region on a periphery of the central rotation axis, in at least a region lower than the central rotation axis, and protrudes toward the rotor core than a surface at a side of the central rotation axis of the surface at the side of the housing of the end side member, and is disposed at an inner side in the radial direction than the opening of the cooling medium holding portion.

2. The generator motor cooling structure according to claim 1, wherein an end portion of the protrusion portion in the direction of the central rotation axis is located closer to an inner side surface of the cooling medium holding portion than an outer side surface of the cooling medium holding portion.

3. The generator motor cooling structure according to claim 1, wherein the protrusion portion is provided on an entire periphery of the central rotation axis of the input/output shaft.

4. A system, comprising:
a generator motor; and
a generator motor cooling structure that is a component of the generator motor for cooling the generator motor, which includes a housing storing an input/output shaft to which a rotor is attached and a stator disposed at an outer periphery portion of the rotor, by a cooling medium, wherein the generator motor cooling structure includes:
a protrusion portion that protrudes toward a rotor core disposed at an outer periphery portion of the rotor from a surface at a side of the housing of an end side member disposed at one end portion of the housing in a direction of a central rotation axis of the input/output shaft,
an annular-shaped blade that is provided at an end portion of the rotor in the direction of the central rotation axis,
a cooling medium holding portion that is provided at an outer periphery portion of the blade, is opened to an inner side of the blade in the radial direction, and holds the cooling medium cooling the generator motor, and
a cooling medium outflow hole that is provided at the blade and passes the cooling medium held by the cooling medium holding portion to an outer side in the radial direction, wherein the protrusion portion is provided on an inner side of a coil of the stator in a radial direction, on an outer side of a bearing attached to the input/output shaft in the radial direction, in at least a partial region on a periphery of the central rotation axis, in at least a region lower than the central rotation axis, and protrudes toward the rotor core than a surface at a side of the central rotation axis of the surface at the side of the housing of the end side member, and is disposed at an inner side in the radial direction than the opening of the cooling medium holding portion.

5. The system according to claim 4, wherein an output shaft of a power generating source is connected to one end of the input/output shaft, and an input shaft of a target to be driven by power of the power generating source is connected to the other end of the input/output shaft.

6. A generator motor cooling structure for cooling a generator motor, which includes a housing storing an input/output shaft to which a rotor is attached and a stator disposed at an outer periphery portion of the rotor, comprising:
   a protrusion portion that protrudes toward a rotor core disposed at an outer periphery portion of the rotor from a surface at a side of the housing of an end side member disposed at one end portion of the housing in a direction of a central rotation axis of the input/output shaft, and is provided on an entire periphery of the central rotation axis of the input/output shaft;
   annular-shaped blades that are provided at both end portions of the rotor in the direction of the central rotation axis;
   a cooling medium holding portion that is provided at an outer periphery portion of each of the blades, is opened to an inner side of the blade in the radial direction, and holds a cooling medium cooling the generator motor; and
   a cooling medium outflow hole that is provided at each of the blades and passes the cooling medium held by the cooling medium holding portion to an outer side in the radial direction,
   wherein the protrusion portion is disposed at an inner side in the radial direction than the opening of the cooling medium holding portion, in at least a region lower than the central rotation axis, and protrudes toward the rotor core than a surface at a side of the central rotation axis of the surface at the side of the housing of the end side member, and an end portion of the protrusion portion in the direction of the central rotation axis overlaps with an end portion of the cooling medium holding portion in the direction of the central rotation axis.

\* \* \* \* \*